United States Patent
Lee et al.

(10) Patent No.: US 7,428,385 B2
(45) Date of Patent: Sep. 23, 2008

(54) ETHERNET PON USING TIME DIVISION MULTIPLEXING TO CONVERGE BROADCASTING/VIDEO WITH DATA

(75) Inventors: Ki-Cheol Lee, Suwon-si (KR); Yun-Je Oh, Yongin-si (KR); Kee-Sung Nam, Seoul (KR); Tae-Sung Park, Yongin-si (KR)

(73) Assignee: Samsung Electronics Co., Ltd., Maetan-Dong, Yeongtong-Gu, Suwon-Si, Gyeonggi-Do (KR)

( * ) Notice: Subject to any disclaimer, the term of this patent is extended or adjusted under 35 U.S.C. 154(b) by 523 days.

(21) Appl. No.: 10/922,403

(22) Filed: Aug. 19, 2004

(65) Prior Publication Data

US 2005/0152697 A1 Jul. 14, 2005

(30) Foreign Application Priority Data

Jan. 12, 2004 (KR) .................... 10-2004-0002017

(51) Int. Cl.
*H04J 14/08* (2006.01)
(52) U.S. Cl. ..................... 398/100; 398/66; 398/67; 398/76; 398/98; 398/101
(58) Field of Classification Search ............. 398/66–76, 398/98–100; 370/395.1, 442–468
See application file for complete search history.

(56) References Cited

U.S. PATENT DOCUMENTS

| | | |
|---|---|---|
| 4,020,765 A | 5/1977 | Glass et al. |
| 4,372,211 A | 2/1983 | Dante |
| 4,473,747 A | 9/1984 | Brofardh |
| 4,772,417 A | 9/1988 | Pappalardo et al. |
| 4,991,150 A | 2/1991 | Wixom |
| 5,446,334 A | 8/1995 | Gaffney |
| 5,581,082 A | 12/1996 | Hansma et al. |
| 5,905,260 A | 5/1999 | Sage |
| 6,071,632 A | 6/2000 | Hall-Goulle |

(Continued)

FOREIGN PATENT DOCUMENTS

JP 2000-036828 * 2/2000

(Continued)

OTHER PUBLICATIONS

Akiyama, Morito, Xu, Chao-Nan and Nonaka, Kazuhiro, "Improvement in Mechanoluminescence Intensity of Ca2Al2SiO7 by the Statistical Approach", Journal of the Electrochemical Society, 150, pp. H115-H118 (2003).

(Continued)

*Primary Examiner*—Kenneth Vanderpuye
*Assistant Examiner*—Li Liu
(74) *Attorney, Agent, or Firm*—Cha & Reiter, LLC

(57) ABSTRACT

An Ethernet passive optical network provides a subscriber with a high speed and large capacity data service and a real time digital broadcast/video service. The network includes an optical line terminal for frame-multiplexing broadcast/video signals, which are obtained by performing a switching operation and a time-slot multiplexing with respect to a plurality of digital broadcast/video data delivered from external broadcasting vendors according to broadcast/video selection information delivered from each user, and communication data delivered through an Internet protocol network.

15 Claims, 23 Drawing Sheets

U.S. PATENT DOCUMENTS

| | | | |
|---|---|---|---|
| 6,117,574 | A | 9/2000 | Watanabe et al. |
| 6,159,394 | A | 12/2000 | Akiyama et al. |
| 6,270,117 | B1 | 8/2001 | Storey |
| 6,281,617 | B1 | 8/2001 | Qiu et al. |
| 6,546,014 | B1 * | 4/2003 | Kramer et al. ......... 370/395.41 |
| 6,571,446 | B2 | 6/2003 | Qiu et al. |
| 6,710,328 | B1 | 3/2004 | Mastro et al. |
| 6,796,555 | B1 * | 9/2004 | Blahut .................... 370/395.1 |
| 2003/0124383 | A1 | 7/2003 | Akiyama et al. |
| 2003/0137975 | A1 * | 7/2003 | Song et al. .................. 370/353 |
| 2003/0179769 | A1 * | 9/2003 | Shi et al. .................... 370/442 |
| 2004/0058150 | A1 | 3/2004 | Geddes et al. |
| 2004/0076181 | A1 * | 4/2004 | Pantelias et al. ............ 370/468 |

FOREIGN PATENT DOCUMENTS

| | | | |
|---|---|---|---|
| JP | 2001-069488 | | 3/2001 |
| JP | 2003-092583 | * | 3/2003 |
| JP | 2003-169068 | | 6/2003 |

OTHER PUBLICATIONS

Xu, Chao-Nan, Watanabe, Tadahiko and Akiyama, Morito, "Direct view of stress distribution in solid by mechanoluminescense", Applied Physics Ltr, vol. 74, No. 17, pp. 2414-2416, no date available.

Xu, Chao-Nan, Zheng, Xu-Guang, Akiyama, Morito, Nonaka, Kazuhiro and Watanabe, Tadahiko, "Dynamic Visualization of Stress Distribution by Mechanoluminescence Image", Applied Physics Ltr., vol. 76, No. 2, pp. 179-181, Jan. 10, 2000.

Bell, James H., Schalrer, Edward T., Hand, Lawrence A. and Mehta, Rabindra D., "Surface Pressure Measurements Using Luminescent Coatings", Annu. Rev. Fluid Mech, pp. 155-206 2001.

Mastro, Stephen and Mathur, Veerendra, "Spectral and Environmental Characterization of Triboluminescent Sensor Material for Damage Detection", Carderock Division Research Digest, pp. 1-4, FY01-02, Publically Available After Aug. 13, 2004.

"DERA Propose Triboluminescent Damage Sensors," Aug. 27, 1999, Institute of Physics Website (http://www.iop.org) at http://www.iop.org/Physics/News/0154j (1 page).

Sage, R. Badcock, L. Humberstone, N. Geddes, M. Kemp and G. Bourhill, "Triboluminescent Damage Sensors," Smart Materials and Structures, vol. 8, No. 4, pp. 504-510 (Aug. 1999); electronic copy available from Institute of Physics Website (http://www.iop.org) at http://www.iop.org/EJ/S/1/N91002209/journal/0964-1726 (electronic copy, 7 pages.

"Development of Mechanoluminescence Materials" by A.M. Gadjiko, V.K. Mathur, J. Zaykoski was made at the Electrochemical Society Meeting, May 9-12, 2004, San Antonio, TX. Only abstract was published. Available on Worldwide Web Feb. 12, 2004.

Stephen Mastro, V.K. Mathur, "Fibert Optic Composite Damage Detection System", American Society of Naval Engineers Annual Meeting 2003, Phil. Pa. (5 pages).

V.K. Mathur, J.H. Barkyoumb, Andrew Jarrett, Stephen Mastro, "Emission Characteristics of a Damage Sensor Material," International Symposium on Luminescense, 201 Electrochemical Society Meeting, 2002, Philadelphia; PA (1 page).

* cited by examiner

ETHERNET PON USING TIME DIVISION MULTIPLEXING TO CONVERGE BROADCASTING/VIDEO WITH DATA

PRIORITY

This application claims priority to an application entitled "Ethernet PON for Broadcasting Telecommunication Convergence Using Time Division Multiplexing," filed in the Korean Intellectual Property Office on Jan. 12, 2004 and assigned Serial No. 2004-2017, the contents of which are hereby incorporated by reference.

BACKGROUND OF THE INVENTION

1. Field of the Invention

The present invention relates to optical transmission, and more particularly to an Ethernet passive optical network for providing a subscriber with a high speed and large capacity data service and a real time digital broadcast/video service.

2. Description of the Related Art

A data transmission rate of above 100 Mb/s is required for high speed, real time, service of a combination of large capacity data and digital broadcast/video. Since, however, currently used xDSLs or cable modems have a data transmission rate of 50 Mb/s at maximum, xDSLs and cable modems cannot meet this challenge. Pursuant to studies and research, an optical access network has been suggested as a method for meeting such a requirement. In particular, a passive optical network (PON) has been proposed as an economical optical access network.

Such a PON may be an ATM-PON based on the ATM (asynchronous transfer mode) protocol, a WDM-PON based on a WDM (wave division multiplexing), or an Ethernet PON (E-PON) based on Ethernet. A fiber to the home (FTTH) version of an Ethernet PON structure has been suggested and developed for high speed optical transmission to a home.

Ethernet PONs have generally been developed to fundamentally process communication data. The Ethernet PON employs a wavelength of 1550 nanometers (nm) to transmit data from an optical line termination (OLT) to a plurality of optical network terminations (ONTs) This entails transferring gigabit Ethernet signals at a data rate of 1.25 Gb/s and at a wavelength of 1310 nm. The Ethernet PON has required broadcasting signals, however, as demand for broadcasting services using an optical access network has increased.

To this end, and referring to FIG. 1, suggestion has been made for an overlay broadcasting processing method for transmitting broadcasting signals to a plurality of ONTs by using broadcasting signal wavelengths, which are different from communication data wavelengths. FIG. 1 portrays a conventional Ethernet PON for broadcasting/telecommunication convergence, which includes, positioned between a user and a service node, an optical line terminal (OLT) 100. The latter receives and electro-optically converts a broadcasting signal and a communication signal delivered from a broadcasting vendor and a communication vendor, respectively, and sends the broadcasting signal and the communication signal as a combined optical signal. The conventional Ethernet PON also includes, at the users' side, optical network terminals (ONTs) 200-1 to 200-N for delivering to users information received from the OLT 100. A passive optical splitter 118 and an optical cable connect the OLT 100 to the ONTs (200-1 to 200-N).

The OLT 100 converts optical broadcasting signals delivered through a broadcasting network into optical signals for downstream transmission by means of an opto-electrical converter 115, followed by an electro-optical converter 116. The converted optical signals are amplified by an erbium doped fiber amplifier (EDFA) 117, and the amplified signals are transmitted downstream. The OLT 100 also receives communication data from an internet protocol (IP) network through an IP router 111 and converts the communication data into optical signals by means of an E-PON OLT function processing part 112 so as to transmit the optical signals by means of a transmitter 113. The OLT 100, on the other hand, receives data from the ONTs 200-1 to 200-N and transmits the received data through the IP router 111 to the IP network.

The ONTs 200-1 to 200-N consequently receive, by means of broadcasting receivers 119-1 to 119-N, the broadcasting signals and deliver the broadcasting signals to users through broadcasting set-top boxes 122-1 to 122-N. As to the communication data, the ONTs 200-1 to 200-N receive it by means of receivers 120-1 to 120-N and deliver it to users through E-PON ONT function processing parts 123-1 to 123-N. In addition, the ONTs 200-1 to 200-N receive upstream communication data from a user by means of the E-PON ONT function processing parts 123-1 to 123-N and forward the received data sent by means of burst mode transmitters 121-1 to 121-N.

The EDFA 117 is expensive, and is required to deliver analog broadcasting signals to the ONTs 200-1 to 200-N. Even if only digital broadcasting is processed an expensive EDFA is still required if the number of digital broadcasting channels increases.

Since all broadcasting channels are transferred to the ONTs 200-1 to 200-N, the ONTs 200-1 to 200-N require expensive optical receivers featuring great receiving-sensitivity, superior noise-characteristics, etc., in order to receive broadcasting signals transferred from the OLT 100. Additionally, an optical transmitter required for the OLT. Moreover, although subscribers may require high definition and real-time digital video services as well as digital broadcasting services in the future, it is difficult for the conventional Ethernet PON to process high definition and real-time digital video services.

In order to solve the above described problems, an Ethernet PON has been proposed in which broadcast/video channels are time-division multiplexed together with GbE (Gigabit Ethernet) communication data and are transferred to an ONT. Accordingly, it is unnecessary to employ an EDFA and it is unnecessary for an OLT and an ONT to additionally have an optical transmitter and an optical receiver, respectively. In addition, the Ethernet PON ensures quality of service (QoS) for high definition digital video, to be required by subscribers in the future, as well as for digital broadcasting. However, in the proposed Ethernet PON, a broadcast/video time-slot is specifically assigned to every subscriber and is used only for transmitting broadcast/video. Also, when a subscriber does not look at and listen to broadcast/video, a time-slot assigned to the subscriber is not used. For example, if the E-PON has a 1×16 structure and broadcast/video data, e.g., an MPEG transport stream (MPTS) having a data rate of 27 Mb/s, a band assigned for the broadcast/video data has a data rate about 432 Mb/s even if a guard band is excluded from a consideration. The data rate of 432 Mb/s corresponds to 50% of the available bands of GbE. Accordingly, considerable waste of bandwidth occurs if the broadcast/video time-slot is not used even if a user does watch or listen to the broadcast/video.

FIGS. 2A, 2B show and OLT and ONT, respectively, using time division multiplexing in a conventional Ethernet PON structure. The conventional Ethernet PON includes, as shown in FIGS. 2A and 2B, one OLT, an optical splitter 216, and multiple ONTs, each of the ONTs being assigned, for example, to a single user OLT 300, referring to FIG. 2A, includes a broadcast/video channel selection switch 21, a broadcast/video time-slot multiplexer 22, a broadcast/video channel selection control part 23, an IP router 24, and Ethernet PON OLT function processing part 25, a scrambler controller 26, a frame multiplexer 27, and Ethernet time-slot matching buffer 28, and electro-optical converter 209 and an opto-electrical converter 210. The switch 21 performs switching for MPEG (Motion Picture Experts Group) broadcasting and video data. After receiving selection channel information from ONTs 200-1 to 200-16, the broadcast/video channel selection control part 23 delivers, to the broadcast/video channel selection switch 21, control signals for selecting broadcast/video channels. The broadcast/video time-slot multiplexer 22 connected to the broadcast/video channel selection switch 21 performs time division multiplexing for broadcast/video channels selected by each subscriber in one time-slot. IP router 27 is used for routing communication data to an upper layer IP network or an Ethernet PON OLT function processing part 25 for processing Ethernet-PON OLT functions. The Ethernet time-slot matching buffer 28 stores communication data from the Ethernet PON OLT function processing part 25 to be sent to an ONT. The communication data is matched with broadcast/video signals time-division multiplexed so as to deliver matched data to the ONT. Frame multiplexer 27 multiplexes into one frame broadcasting/image signals of the broadcast/video time-slot multiplexer 22 and Ethernet communication signals of the Ethernet time-slot matching buffer 28. The optical transmitter 209 optically modulates frame multiplexed signals for subsequent transfer of the modulated frame multiplexed signals $\lambda_{down}$. The optical receiver 210 receives upstream optical signals from the ONT and converts them into electrical signals. WDM coupler 211 performs combination/division by transmission/reception wavelength.

The ONT, referring to FIG. 2B, includes a WDM coupler 217, an electro-optical converter 218, an opto-electrical converter 219, a frame & time-slot demultiplexer 220, and E-PON ONT function processing part 221 and a broadcast/video matching unit 222. The WDM coupler 217 combines/splits wavelengths to be transmitted and wavelengths being received. The optical receiver 219 receives through the WDM coupler 217 optical signals $\lambda_{down}$ from the OLT and opto-electrically converts the signals. Optical transmitter 218 transmits data upstream to the OLT. The frame and time-slot demultiplexer 220 receives broadcast/video signals and Ethernet communication signals which have been time-slot multiplexed into respective frames, and separates the broadcast/video signals from the Ethernet communication signals. The Ethernet PON ONT function processing part 221 processes an ONT function, and the broadcast/video matching unit 222 recovers original signals from separated broadcast/video signals.

FIG. 3 illustrates the above-mentioned frame format for a single frame 31 and time-slots 32-1 to 32-n associated with that frame, for broadcast/video signals and Ethernet communication signals associated with the respective time slots. This format is employed in the Ethernet PON structure shown in FIGS. 2A, 2B.

As shown in FIG. 3, the time-slots include broadcast/video sub time-slots 33-1, 34-1, and 35-1 and Ethernet sub time-slots 33-2, 34-2, and 35-2 whose content varies according to selections made by the subscribers. In particular, the broadcast/video sub time-slot within the $i^{th}$ time-slot includes only broadcast/video signals, if any, selected by the $i^{th}$ ONT. Therefore, for example, if the broadcast/video signals have not been selected by the user for the $i^{th}$ ONT, the broadcast/video sub time-slot within the predetermined $i^{th}$ time-slot is vacant or includes null data. The data rate of the broadcast/video signals is 1.25 G/2k [b/s] (k=0, 1, 2, . . . ), for example, the Ethernet communication signals being 1.25 GbE.

Each of Ethernet sub time-slots within all time-slots may, by contrast, include communication data of any of the ONTs. For example, although the broadcast/video sub time-slot 33-1 of the first time-slot 32-1 is limited to only broadcast/video signals, if any, selected by a first ONT, the Ethernet sub time-slot 33-2 within the first time-slot 32-1 can be assigned to the Ethernet communication signaling of any of the ONTs. The same applies to other time-slots 32-2, 32-3.

However, in the conventional Ethernet PON shown in FIGS. 2A, 2B, a broadcast/video time-slot is specifically assigned to every subscriber as shown in FIG. 3 and is used only for transmitting broadcast/video. Also, when a user does not watch or listen to broadcast/video, the time-slot assigned to the user is not used. For example, if the E-PON has a 1×16 structure and broadcast/video data are carried on an MPEG transport stream (MPTS) having a data rate of 27 Mb/s, a band assigned for broadcast/video has a data rate about 432 Mb/s even if a guard band is excluded from a consideration. Herein, the data rate of 432 Mb/s corresponds to 50% of the available bands of GbE. Accordingly, if the broadcast/video time-slot is not used even if a user does watch or listen to the broadcast/video, serious waste of bandwidth incurs.

SUMMARY OF THE INVENTION

The present invention has been made to solve the above-mentioned problems occurring in the prior art, and a first object of the present invention is to provide a time division multiplexing (TDM) Ethernet passive optical network (E-PON) for converging broadcasting/video with data in which the subscriber is provided with high-definition, real-time digital broadcasting/video as well as large-capacity data communication at high speed.

A second object of the present invention is to provide a TDM E-PON, for converging broadcasting/video with data, capable of transmitting from the OLT to an ONT broadcasting channels selected by a subscriber without using an EDFA to receive broadcasting services. Accordingly, the ONT may utilize a low-requirement, inexpensive optical receiver for receiving broadcasting.

A third object of the present invention is to provide a TDM E-PON, for converging broadcasting/video with data, capable of ensuring quality of service (QoS) when transmitting high-definition digital video to be required by subscribers in the future as well as digital broadcasting.

A fourth object of the present invention is to provide a TDM E-PON, for converging broadcasting/video with data, capable of performing bi-directional broadcasting functions by delivering broadcasting information through communication data lines of an Ethernet passive optical network.

A fifth object of the present invention is to provide an Ethernet passive optical network for broadcasting/telecommunication convergence using time division multiplexing, capable of efficiently solving a problem of bandwidth waste by utilizing time-slots assigned for broadcasting/video as data communication time-slots when subscribers do not watch or listen to broadcasting/video.

In order to accomplish these objects, there is provided an Ethernet passive optical network (E-PON) for broadcasting/telecommunication convergence using time division multiplexing, the Ethernet passive optical network being configured for time division multiplexing, into respective frames, signals with communication data. The signals to be multiplexed include broadcast and video signals and are obtained by performing a switching operation with respect to digital broadcast and/or digital video data for downstream delivery to at least one of multiple users of the E-PON. The communication data to be multiplexed is delivered to the network through an Internet protocol network. The switching operation is carried out according to selection information delivered from one or more of the multiple users.

BRIEF DESCRIPTION OF THE DRAWINGS

The above and other objects, features and advantages of the present invention will be more apparent from the following detailed description taken in conjunction with the accompanying drawings, in which the same or similar components in drawings are designated by the same reference numerals as far as possible throughout the several views.

DETAILED DESCRIPTION

Preferred embodiments of the present invention are described in detail with reference to the accompanying drawings. Details of known functions and configurations incorporated herein are omitted for clarity of presentation.

Figure 1:
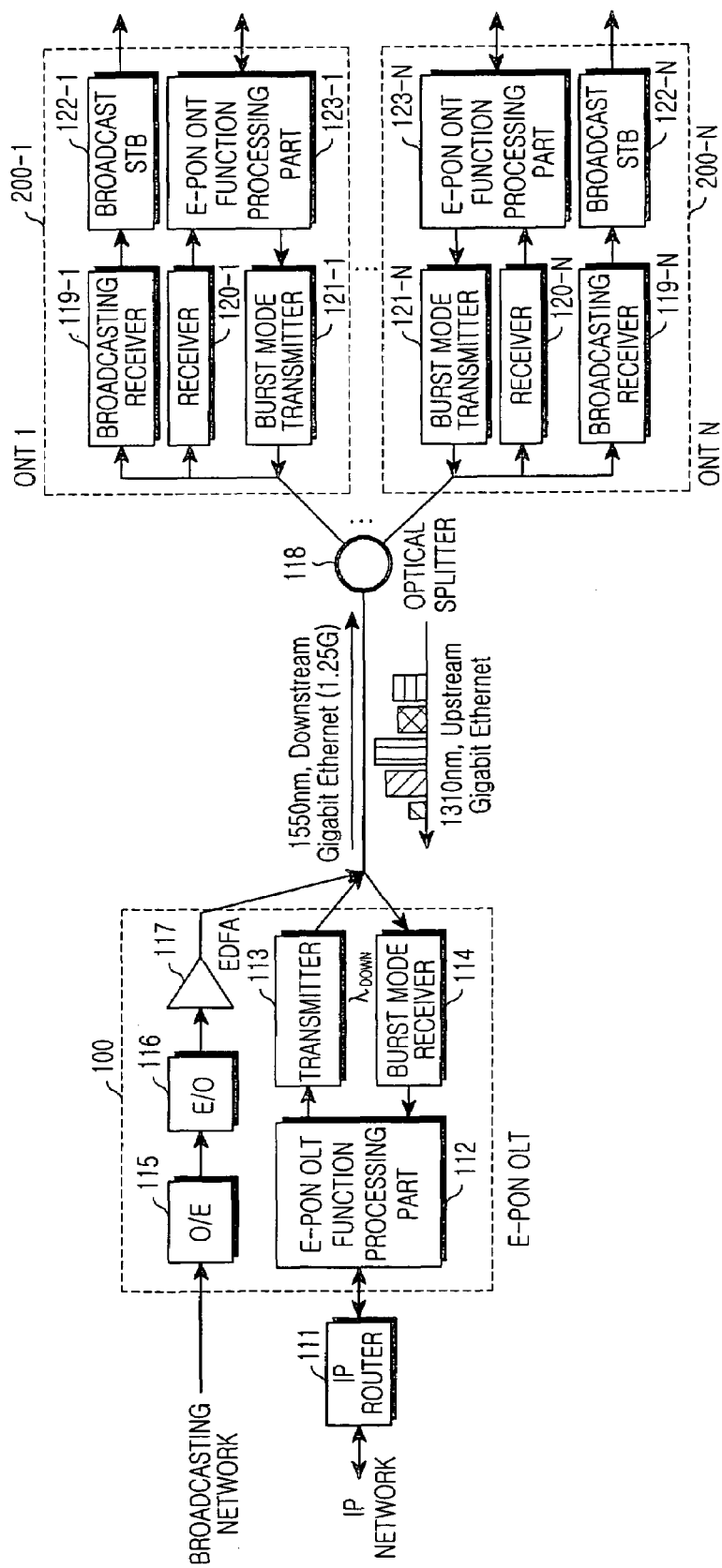
FIG. 1 is a view showing a structure of a conventional Ethernet PON for broadcasting/telecommunication convergence.
Figure 2A:
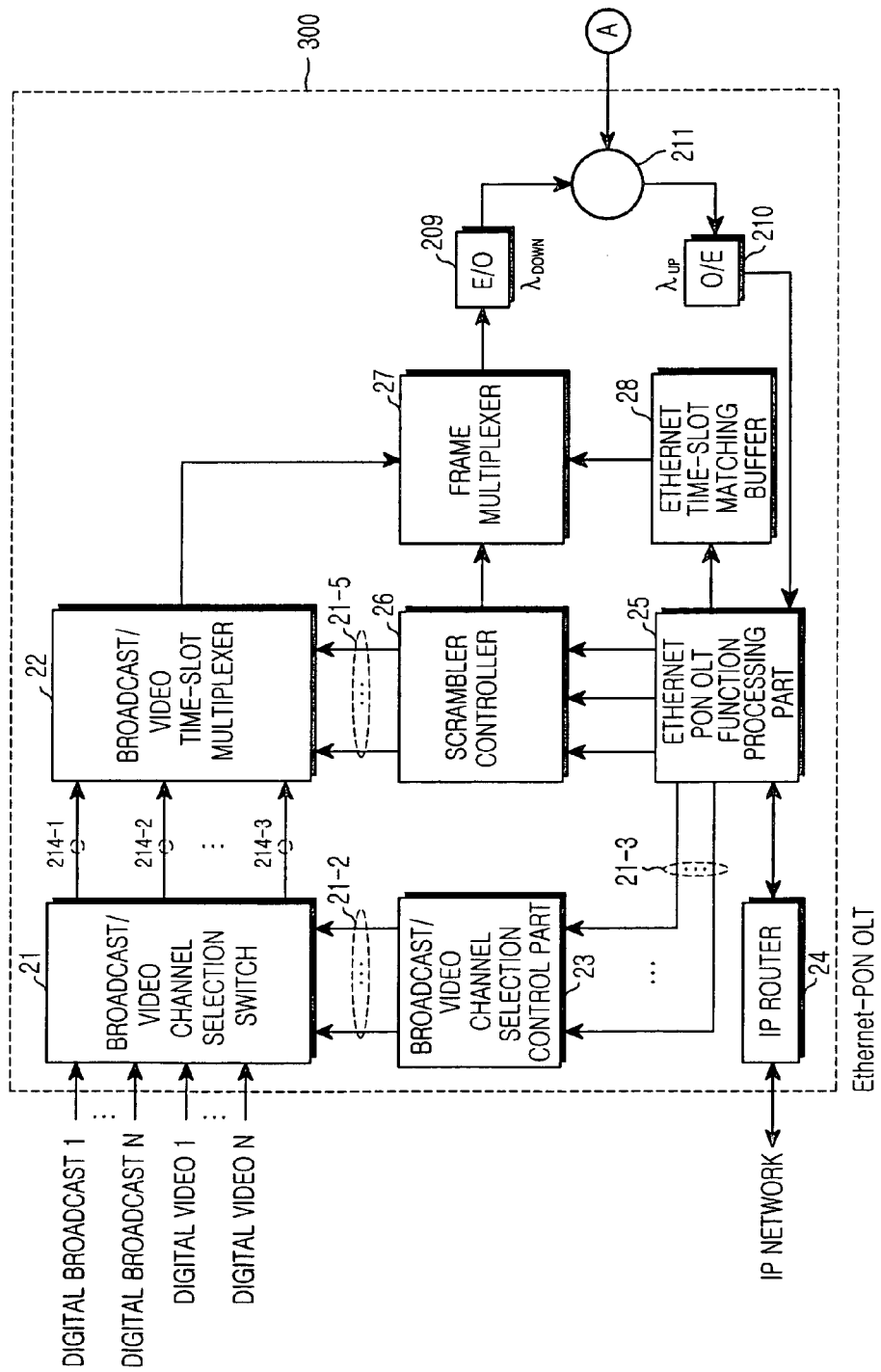
FIGS. 2A, 2B are views showing an example of a conventional Ethernet PON structure for broadcasting/telecommunication convergence using time division multiplexing.
Figure 2B:
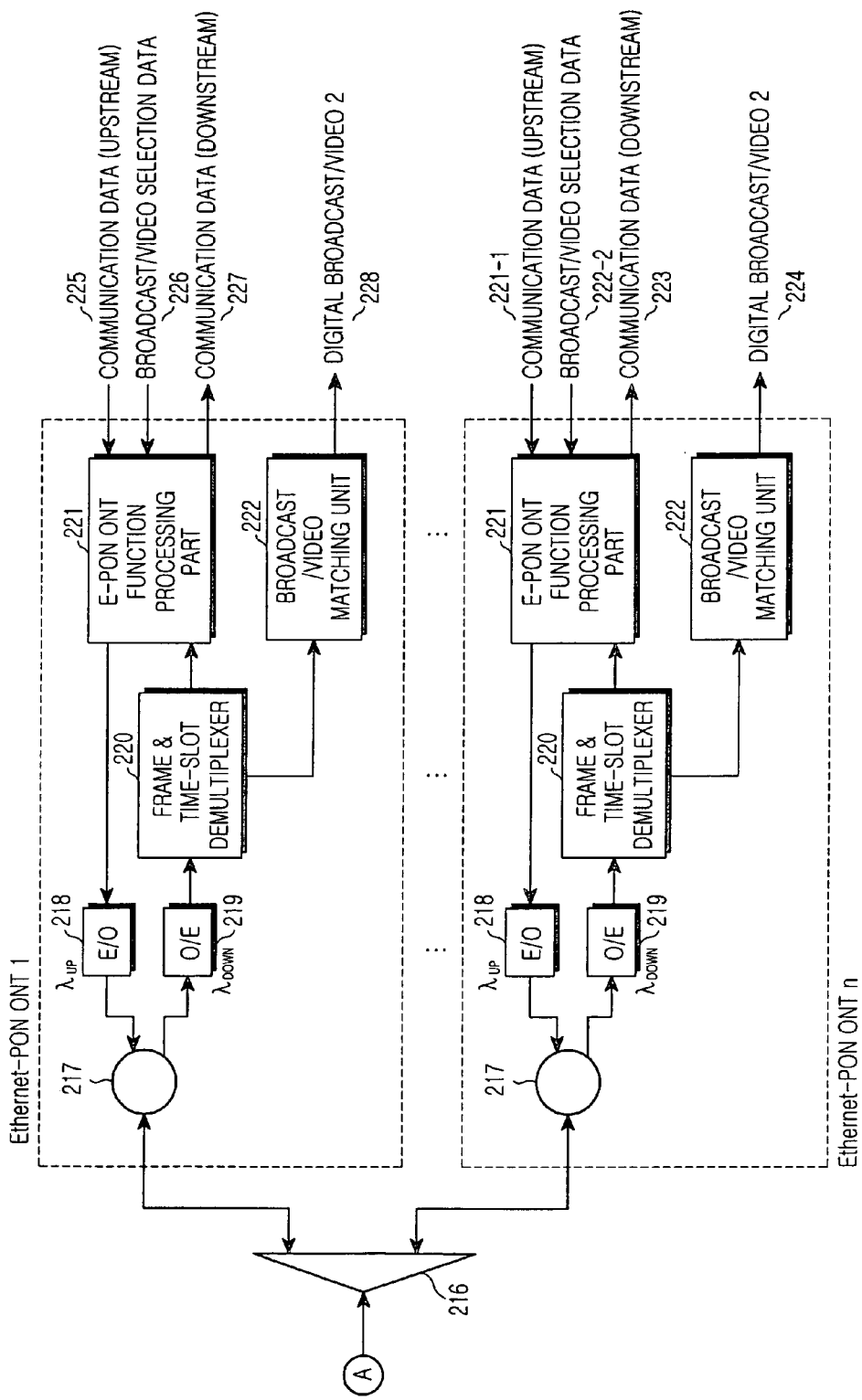
Figure 3:
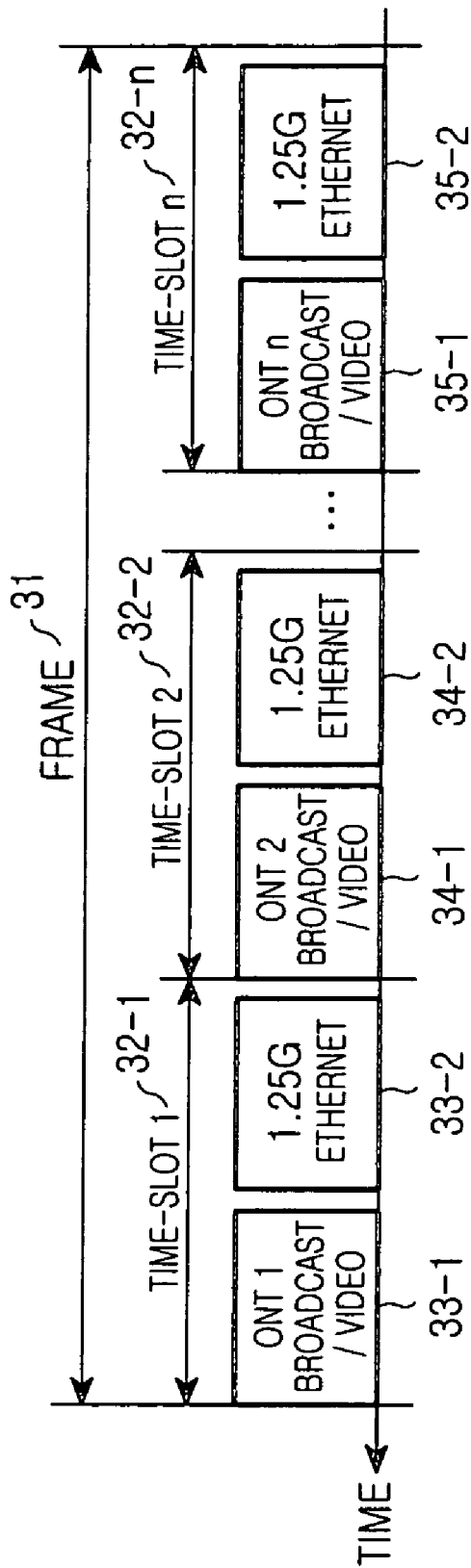
FIG. 3 is a view representing one a frame and time-slots for broadcast/video signals and Ethernet communication signals employed in the Ethernet PON structure shown in FIGS. 2a and 2b.
Figure 4A:
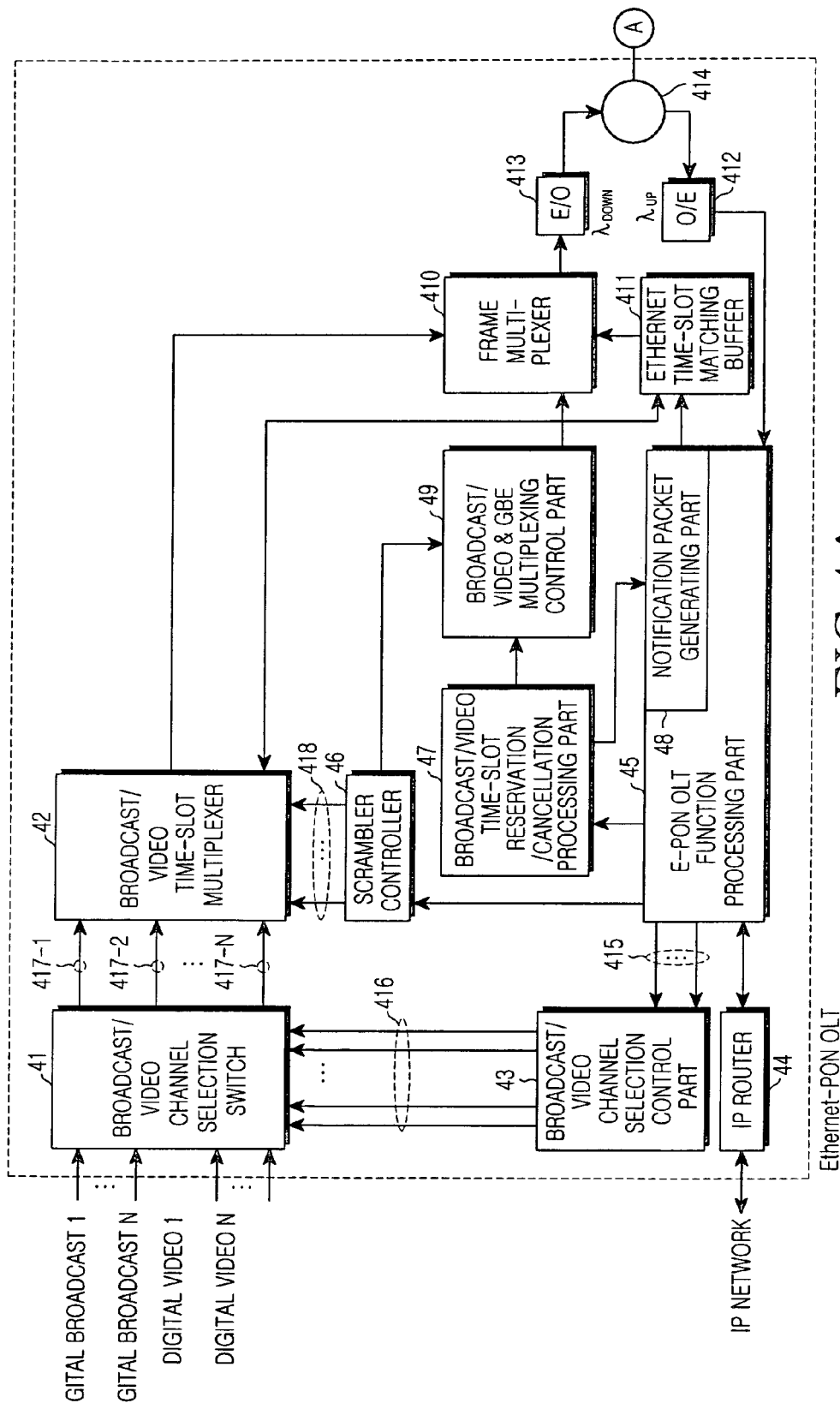
FIGS. 4A, 4B are views showing an Ethernet PON (E-PON) using time division multiplexing (TDM) to converge broadcasting/video with data according to the present invention.
Figure 4B:
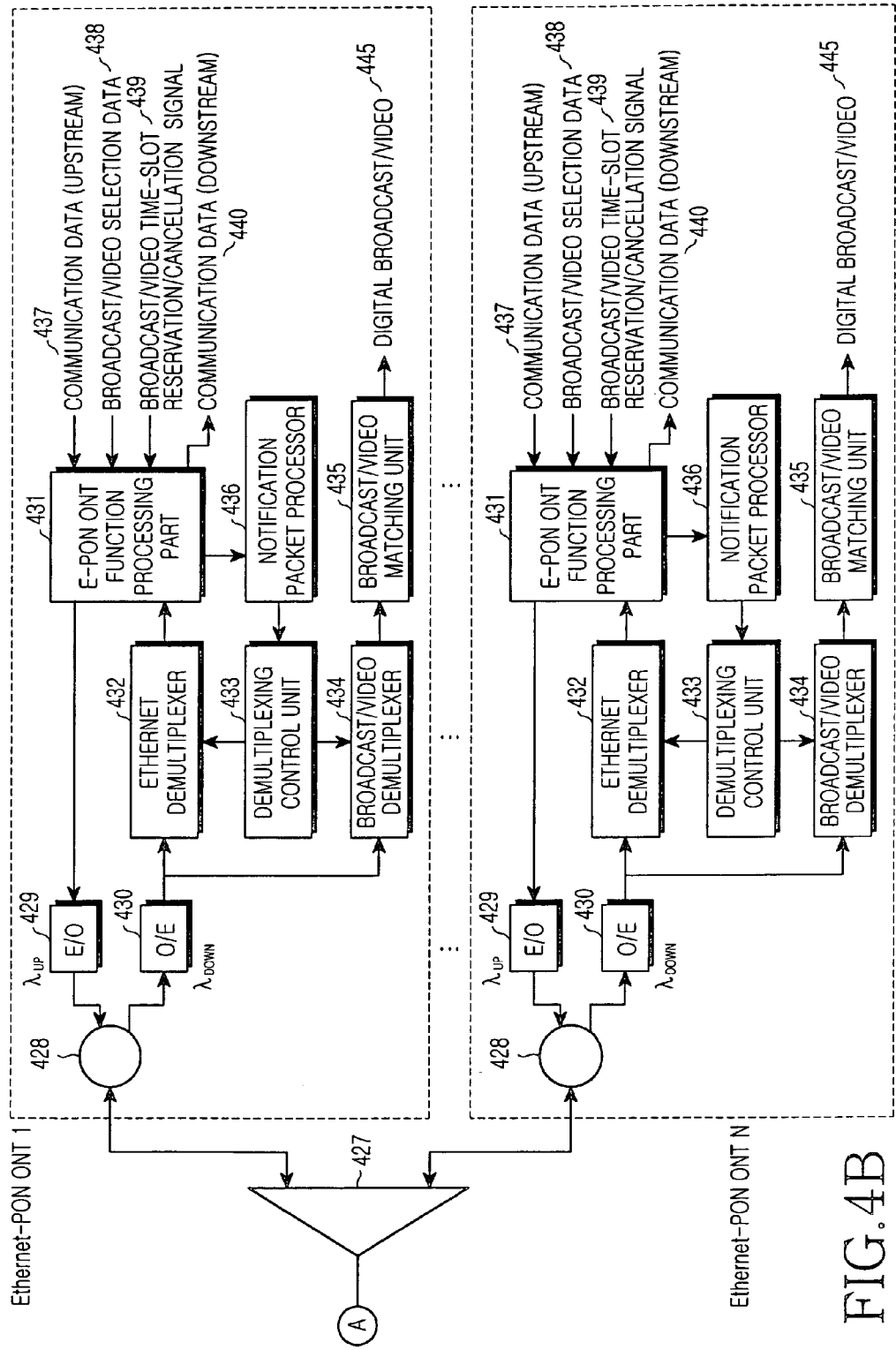

FIGS. 4A, 4B depict, by way of illustrative and non-limitative example, an Ethernet PON (E-PON) using time division multiplexing (TDM) to converge broadcasting/video with data according to the present invention.

As shown in FIGS. 4A, 4B, the TDM E-PON according to the present invention includes one OLT, an optical splitter 427, and N ONTs. Each of the ONTs is assigned to a single user.

The OLT, as seen in FIG. 4A, includes a broadcast/video channel selection switch 41, a broadcast/video time-slot multiplexer 42, a broadcast video channel selection control part 43, an IP router 44, an E-PON OLT function processing part 45 having a notification packet generating part 48, a scrambler controller 46, a broadcast/video time-slot reservation/cancellation processing part 47, a broadcast/video & GbE multiplexing control part 49, a frame multiplexer 410, and Ethernet time-slot matching buffer 411, and opto-electrical converter 412, an electro-optical converter 413 and a WDM coupler 414.

The switch 41 performs switching for MPEG (motion picture experts group) broadcasting and video data. Broadcast/video channel selection control part 43, after receiving selection channel information from the ONTs, delivers to the broadcast/video channel selection switch 41 control signals used for selecting broadcast/video channels. The broadcast/video time-slot multiplexer 42 is connected to the broadcast/video channel selection switch 41 and performs time division multiplexing for broadcast/video channels selected according to subscribers. IP router 44 is used for routing communication data to an upper layer IP network or an Ethernet PON OLT function processing part 45 for processing Ether-PON OLT functions. The synchronization control unit 46 is used for providing synchronization for the broadcast/video time-slot multiplexer 42 and the broadcast/video and GbE multiplexing control unit 49 by using the control signals delivered from the Ethernet PON OLT function processing part 45. Ethernet time-slot matching buffer 411 stores communication data to be sent to each ONT from the Ethernet PON OLT function processing part 45 in order to match the communication data with time division multiplexed broadcast/video signals so as to deliver matched data to each ONT. The broadcast/video time-slot reservation/cancellation processing unit 47 is connected to the Ethernet PON OLT function processing part 45 and processes broadcast/video time-slot reservation and cancellation signals transferred from each ONT. The broadcast/video and GbE multiplexing control unit 49 controls frame multiplexing by using broadcast/video time-slot reservation and cancellation information delivered from the broadcast/video time-slot reservation/cancellation processing unit 47 and synchronization control information delivered from the synchronization control unit 46. Notification packet generating part 48 uses broadcasting/video time-slot reservation and cancellation information delivered from the broadcast/video time-slot reservation/cancellation processing unit 47 to generate notification packets for notifying each of the ONTs of whether or not the ONT receives broadcast/video. Frame multiplexer 410 multiplexes into one frame broadcast/video signals of the broadcast/video time-slot multiplexer 42 and Ethernet communication signals of the Ethernet time-slot matching buffer 411. The optical transmitter 413 optically modulates frame-multiplexed signals to form modulated signals $\lambda_{down}$ and transfers the modulated signals. The optical receiver 412 receives optical signals $\lambda_{up}$ from the ONTs and converts the optical signals into electrical signals. WDM coupler 414 performs combination/division for wavelengths being transmitted and received.

Each ONT, referring to FIG. 4B, includes a WDM coupler 428, an electro-optical converter 429, an opto-electrical converter 430, an E-PON ONT function processing part 431, an Ethernet demultiplexer 432, and broadcast/video matching unit 433, a broadcast/video demultiplexer 434, a broadcast/video matching unit 435 and a notification packet processor 436.

The WDM coupler 428 performs combination/division for wavelengths being transmitted and received. Optical receiver 430 receives from the OLT through the WDM coupler 428 signals delivered as optical signals $\lambda_{down}$ so as to opto-electrically convert the received signals. The optical transmitter 429 transmits upstream data to the OLT. The Ethernet demultiplexer 432 extracts Ethernet signals from frame multiplexed signals delivered through the optical receiver 430. Broadcast/video demultiplexer 434 extracts broadcast/video signals from the frame multiplexed signals delivered through the optical receiver 430. The E-PON ONT function processing part 431, in addition to dealing with ONT functions and delivering downstream (i.e., OLT-to-ONT(s)) communication data 440, receives the Ethernet signals from the Ethernet demultiplexer 432, and delivers to the optical transmitter 429 upstream signals including communication data 437, broadcast/video selection data 438, and broadcast/video selection time-slot reservation/cancellation signals 439. Notification packet processing part 436 processes a notification packet delivered from the E-PON ONT function processing part 431. The demultiplexing control unit 433 is connected to the notification packet processing part 436 and controls the Ethernet demultiplexer 432 and the broadcast/video demultiplexer 434 according to notification packet information. Broadcast/video matching unit 435 recovers original signals (digital broadcast/video 445) from broadcast/video signals delivered from the broadcast/video demultiplexer 434.

Figure 5:
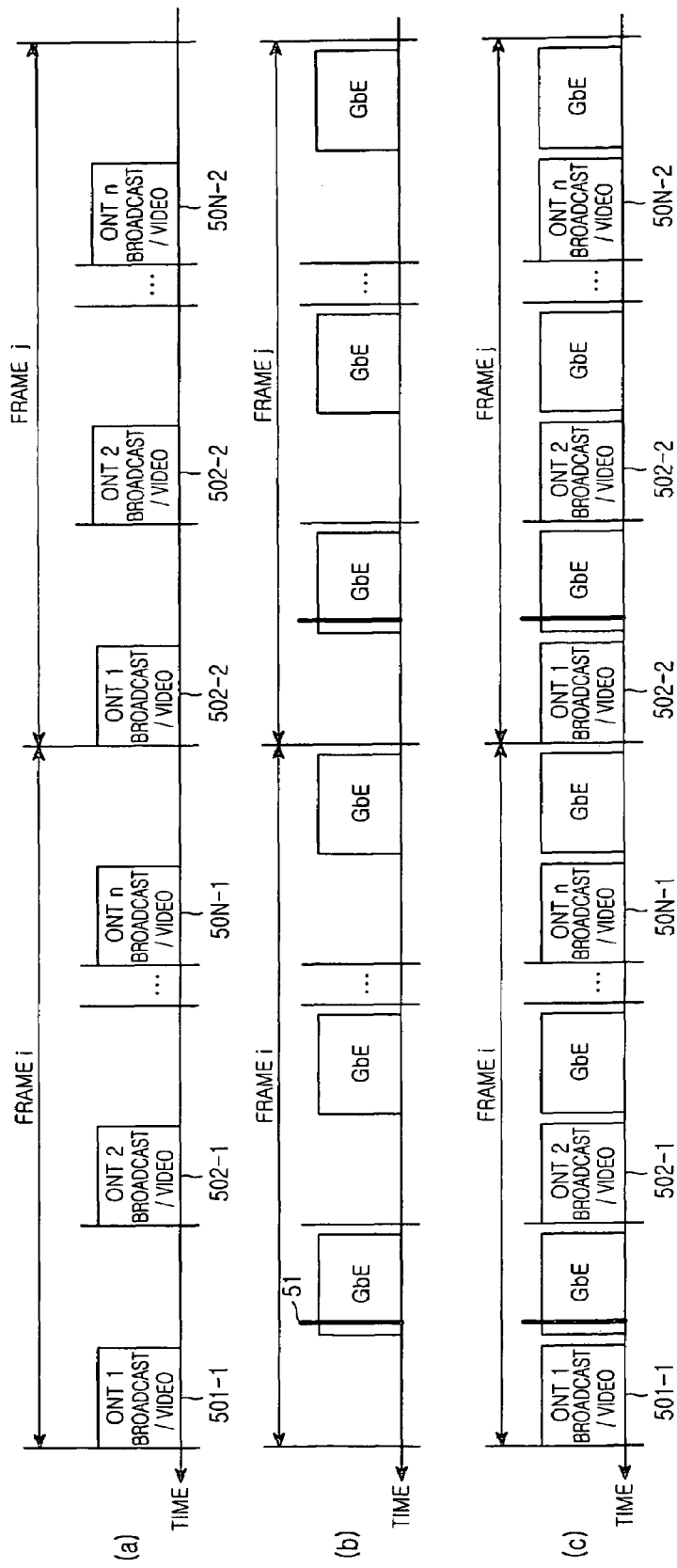
FIG. 5(a)-(c) shows an arrangement of broadcast/video signals and Ethernet communication signals by frame according to one embodiment of the present invention.

FIG. 5(*a*)-(*c*) shows an arrangement of broadcast/video signals and Ethernet communication signals by frame according to one embodiment of the present invention.

Each of frames is divided into n time-slots (the number of ONTs) in order to perform frame multiplexing for broadcast/video signals and Ethernet communication signals according to the present invention. Each of the time-slots includes one broadcast/video sub time-slot and one GbE frame sub time-slot.

FIG. 5(*a*) shows broadcast/video sub time-slots 501-1 to 50N-2 assigned for n respective ONTs in a frame i and in a frame j.

FIG. 5(*b*) shows GbE frame sub time-slots used for transferring GbE frames by using n time-slots assigned to each of the frame i and the frame j.

The first GbE frame sub time-slot shown in FIG. 5*b* contains a notification packet having broadcast/video receiving information of ONTs so as to carry the notification packet. This is represented with reference number 51.

FIG. 5(*c*) is a view showing the frame i and the frame j including multiplexed broadcast/video sub time-slots 501-1 to 50N-2 assigned to n ONTs and GbE frame sub time-slots used for transferring GbE frames through n time-slots.

Figure 6:
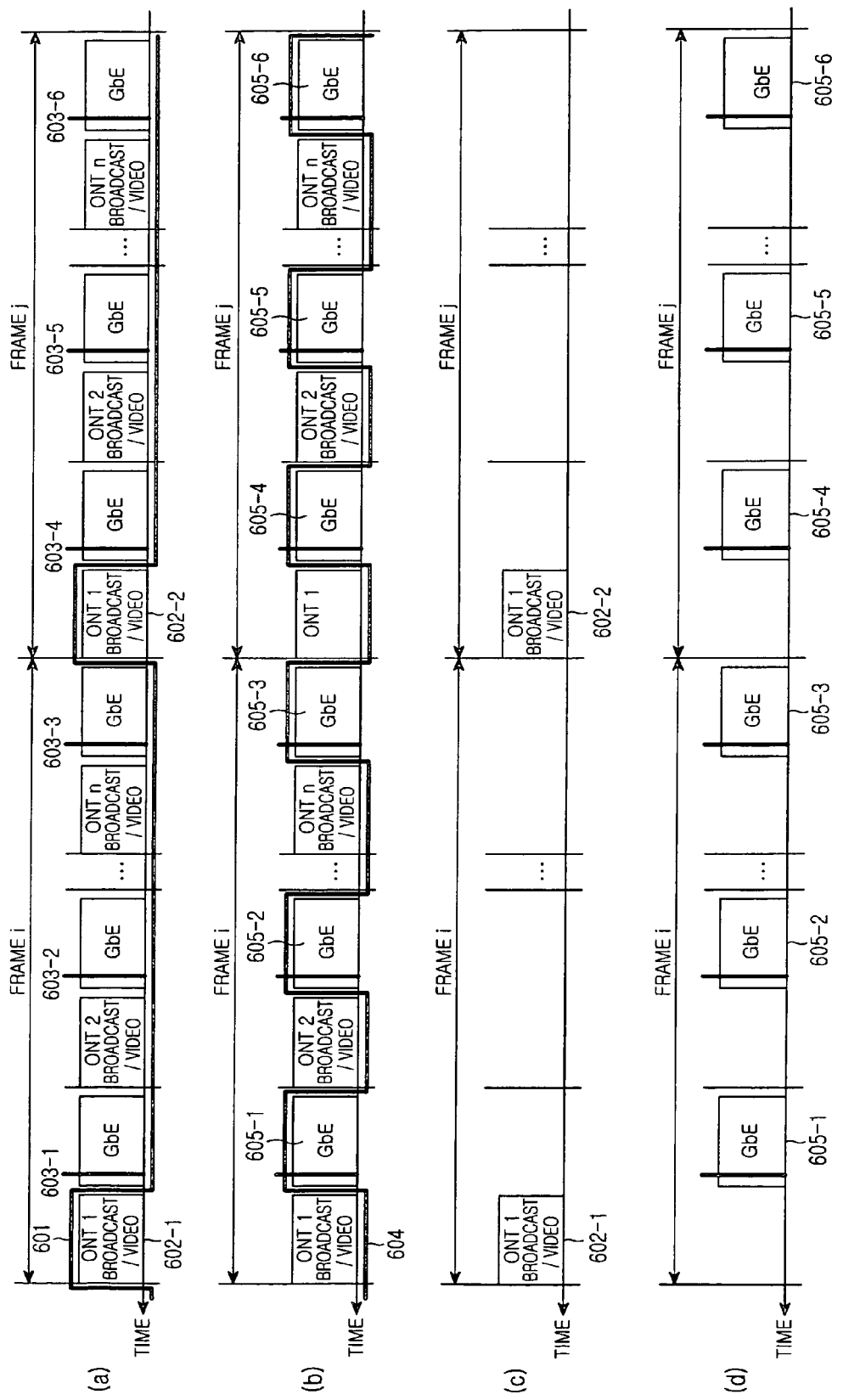
FIG. 6(a)-(d) provides conceptual views representing a procedure of demultiplexing multiplexed frames shown in FIGS. 5a to 5c.

FIG. 6(*a*)-(*d*) represents a procedure of demultiplexing multiplexed frames shown in FIG. 5(*a*)-(*c*).

FIG. 6(*a*) is a view representing a procedure by which a first ONU demultiplexes broadcast/video signals in multiplexed frames shown in FIG. 5(*a*)-(*c*). Broadcast/video sub time-slots assigned to the first ONT are first sub time-slots 602-1, 602-2 included in the frame i and the frame j. Therefore, the first ONT receives only broadcast/video data 602-1, 602-2 corresponding to the first ONT through a filtering procedure 601 shown in FIG. 6(*c*). In FIG. 6(*a*)-(*d*), all GbE sub time-slots include notification packets having broadcast/video receiving information of ONTs, these packets being denoted 603-1 through 603-6.

FIG. 6(*b*) is a view showing that the first ONT performs demultiplexing procedure with respect to GbE frames in the multiplexed frames shown in FIGS. 5A to 5C. All GbE sub time-slots 605-1 to 605-6 included in the multiplexed frames are used for all ONTs. Accordingly, the ONTs perform demultiplexing with respect to the GbE sub time slots 605-1 to 605-6 through a filtering operation 604 the result of which is shown in FIG. 6(*d*).

Figure 7:
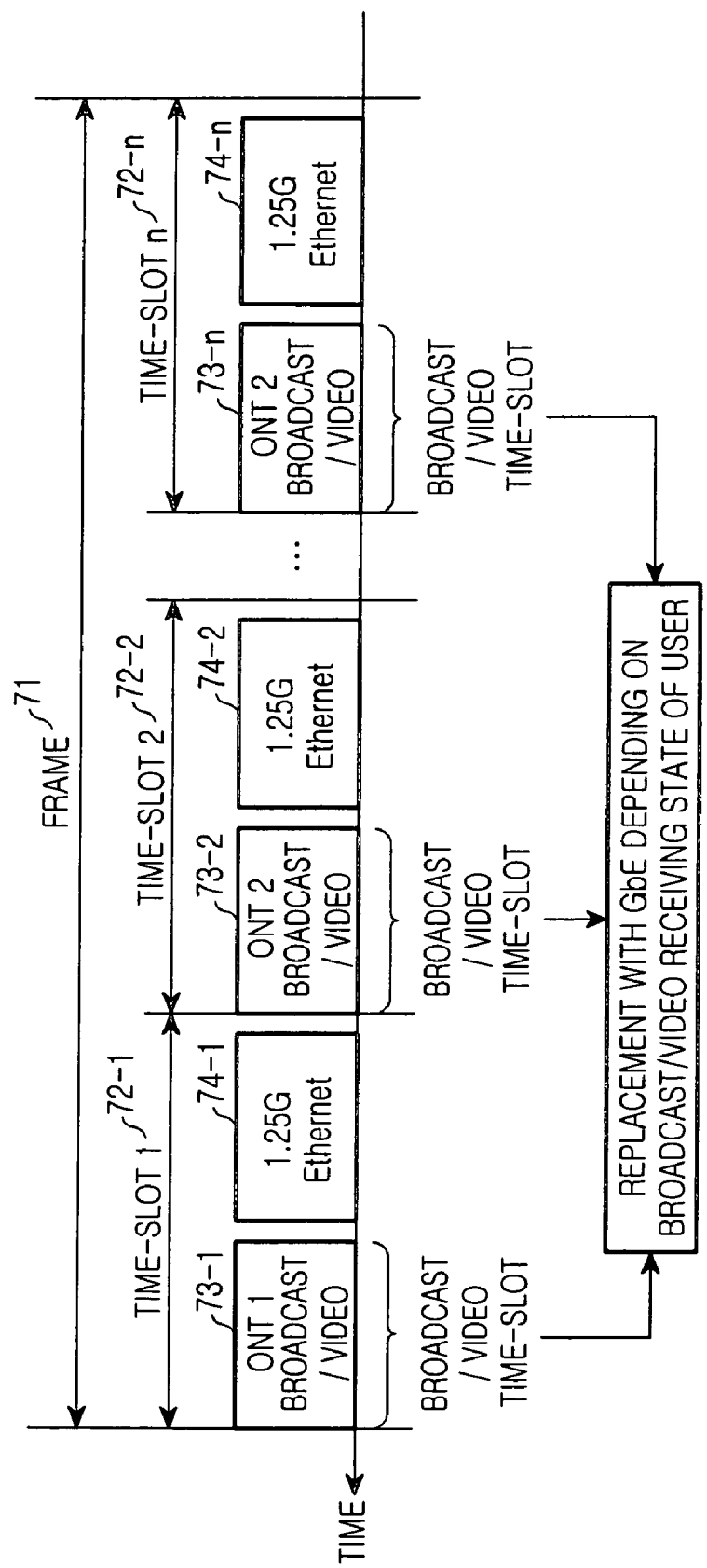
FIG. 7 is a view showing a structure of a frame obtained by multiplexing broadcast/video signals and Ethernet communication signals according to a first embodiment of the present invention.

FIG. 7 is an exemplary view showing a structure of a frame 71 obtained by multiplexing broadcast/video signals and Ethernet communication signals according to a first embodiment of the present invention. The frame 71 includes n time-slots 72-1 to 72-n. The time-slots include broadcast/video sub time-slots 73-1 to 73-n of ONTs and GbE sub time-slots 74-1 to 74-n used for transferring GbE frames (1.25 G Ethernet frames).

A broadcast/video sub time-slot of a predetermined $i^{th}$ time-slot is assigned for a predetermined $i^{th}$ ONT. If the predetermined $i^{th}$ ONT receives broadcast/video, broadcast/video data are transferred through the broadcast/video sub time-slot of the predetermined $i^{th}$ time-slot. However, if the predetermined $i^{th}$ ONT does not receive broadcast/video, instead of broadcast/video data, GbE communication data are transferred through the broadcast/video sub time-slot of the predetermined $i^{th}$ time-slot. Accordingly, it is possible to efficiently utilize bandwidth according to the present invention.

If an ONT does not receive broadcast/video or, alternatively, does not receive communication data, the otherwise vacant sub time slot can be filled with additional information of a type that the ONT does receive. For example, in the frame 71, if a first ONT receives broadcast/video and a second ONT does not receive broadcast/video, a broadcast/video sub time-slot 73-1 of a first time-slot 72-1 has broadcast/video data received by the first ONT, and a broadcast/video sub time-slot 73-2 of a second time-slot 72-2 has GbE communication data (because the second ONT does not receive broadcast/video). The above description identically applies to all time-slots 72-1 to 72-n.

Figure 8:
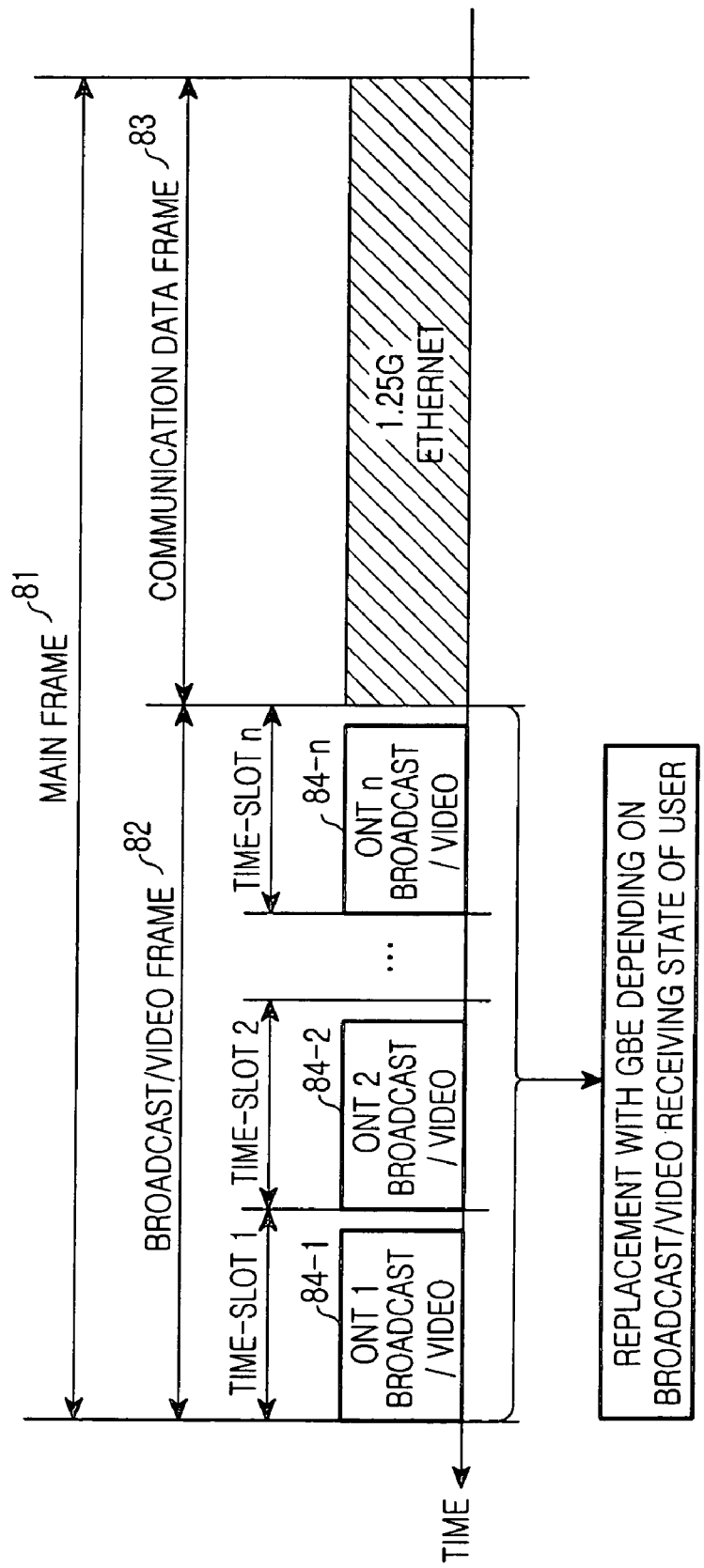
FIG. 8 is a view showing a structure of a frame obtained by multiplexing broadcast/video signals and Ethernet communication signals according to a second embodiment of the present invention.

FIG. 8 illustrates one example of a frame 81 obtained by multiplexing broadcast/video signals and Ethernet communication signals according to a second embodiment of the present invention. The frame 81 obtained by multiplexing broadcast/video signals and Ethernet communication signals according to the present invention includes a broadcast/video frame 82 and a communication data frame 83. The broadcast/video frame 82 has broadcast/video sub time-slots 84-1 to 84-n assigned for ONTs. As described with reference to FIG. 7, the broadcast/video sub time-slots 84-1 to 84-n contain GbE communication data rather than broadcast/video data in the event that the predetermined $i^{th}$ ONT does not receive broadcast/video. The above described frames and time-slots can be variously defined depending on the number of broadcast/video channels, etc., selected by a user.

In order to load the broadcast/video slots with GbE communication data and not broadcast/video data and transfer the GbE communication data when the predetermined $i^{th}$ ONT does not receive broadcast/video, the present invention defines a notification packet notifying the ONTs of whether or not the ONT is to receive broadcast/video, thereby allowing ONTs to discriminate between broadcast/video signals and communication data.

Figure 9:
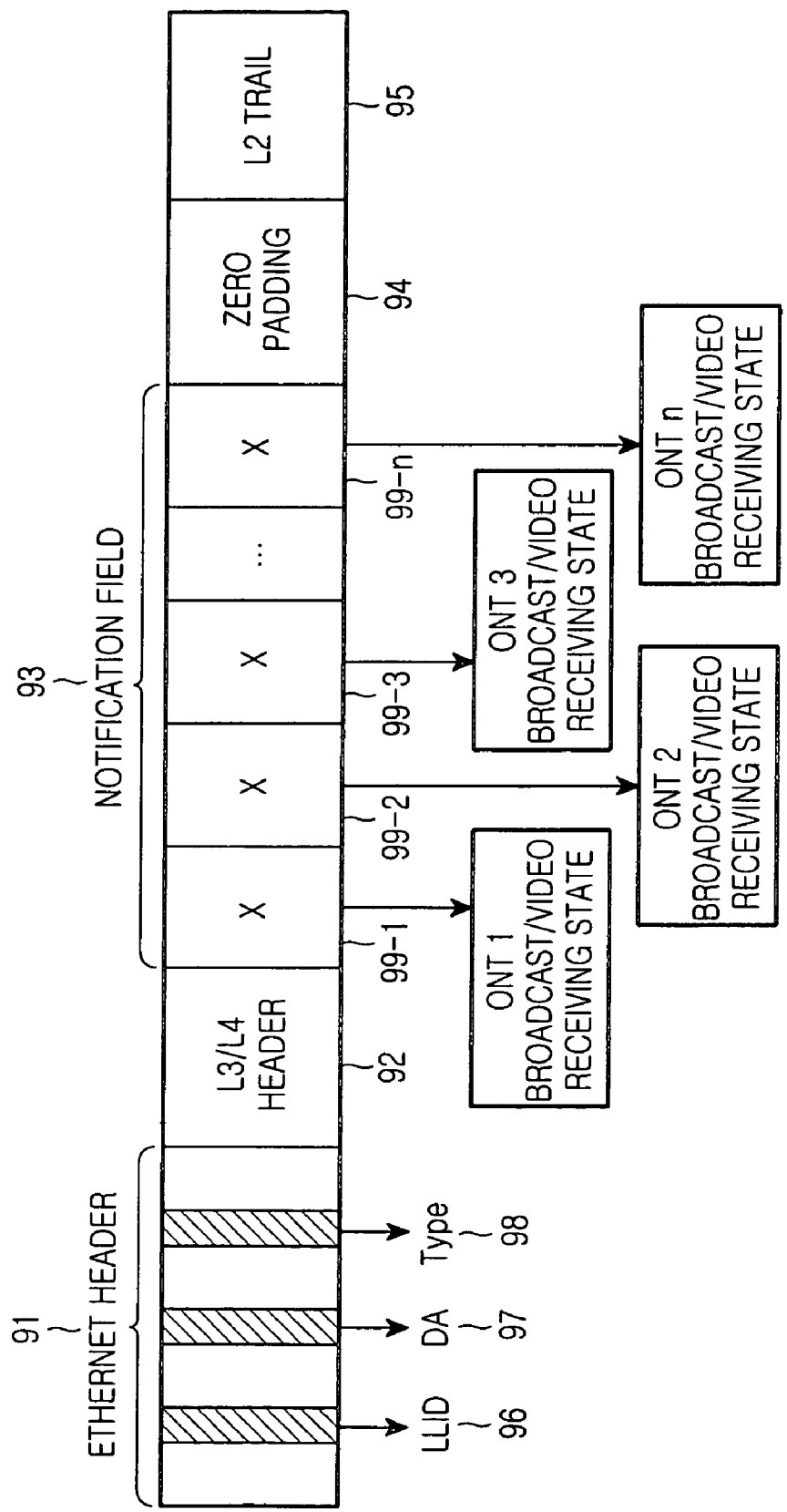
FIG. 9 is a view showing a notification packet structure defined according to the present invention.

FIG. 9 is a view showing a notification packet structure defined according to the present invention. The notification packet, defined as an Ethernet frame, includes an Ethernet header 91, a layer 3/layer 4 (L3/L4) header 92, notification fields 93, a zero padding 94 for achieving the minimum length of 64 bytes, and a layer 2 (L2) trail 95.

Herein, the Ethernet header 91 consists of several fields. A logical link identifier (LLID) 96, a destination MAC address (DA) 97, and a type 98 for representing data types are utilized primarily as notification fields.

Since the notification packet is transferred from an OLT to all ONTs, the LLID 96 and the DA 97 are assigned as broadcasting addresses. The ONT determines the type 98, which is information used for delivering the notification packet received by an ONT to the notification packet processing part 436 shown in FIG. 4B.

The notification packet is used mainly for recording receiving states of the broadcast/video in all ONTs and for transferring the receiving states to each ONT. To this end, the broadcast/video receiving states of all ONTs are marked on the notification fields 93 of the notification packet.

The notification fields 93 are represented as n bits 99-1, 99-2, 99-3, . . . , 99-n, corresponding to the number of ONTs. A '0' value of a predetermined $i^{th}$ bit means that a predetermined $i^{th}$ ONT does not receive broadcast/video, and the value '1' of the predetermined $i^{th}$ bit means that the predetermined $i^{th}$ ONT receives broadcast/video.

For example, in an 1×16 EPON, values of the notification field 93 within the notification packet '1111001100111100' represent that first, second, third, fourth, seventh, eighth, eleventh, twelfth, thirteenth, and fourteenth ONTs receive broadcast/video, and fifth, sixth, ninth, tenth, fifteenth, and sixteenth ONTs do not receive broadcast/video.

Although the notification fields are defined as n bits according to the present invention shown in FIG. 9, the notification fields may, if necessary, be defined as n×m (herein, m is a predetermined natural number) bits.

Figure 10:
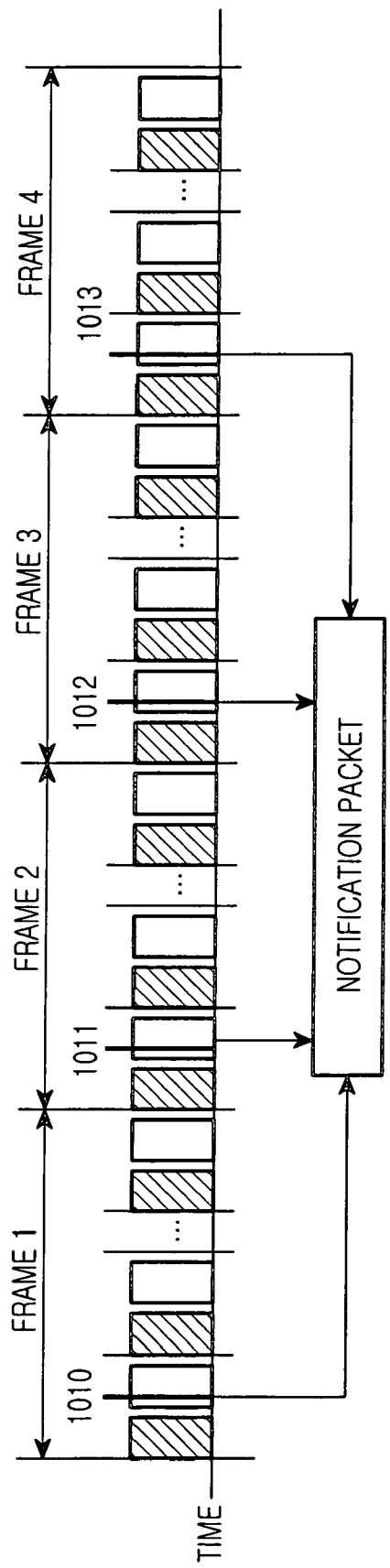
FIG. 10 is a view showing a method of transferring a notification packet.

The notification packet employing the Ethernet frame described above can be variously defined within the Ethernet frame. As shown in FIG. 10, the notification packet defined above is updated in each frame and is positioned at a first time-slot for every frame (as seen from reference numbers 1010, 1011, 1012, and 1013) so as to be transferred to all ONTs.

Positioning the notification packet is preferably at a first time-slot of each frame, because it is necessary for a received notification packet to be processed before the corresponding frame elapses.

With reference to FIGS. 4A, 4B in illustrating basic operation of the invention, N digital broadcasting channels and N digital video channels are inputted to the broadcast/video channel selection switch 41. The number of broadcasting and video channels may differ, however.

On the user side, one or more subscribers (ONTs) specify a respective broadcast/video channel by remote controller. Signals of the specified broadcast/video channel are inputted, as broadcast/video channel selection data 438, from the ONT to the OLT. The broadcast/video channel selection data 438 inputted to the OLT are transmitted through the EPON OLT function processing part 45 to the broadcast/video channel selection part 43. The latter uses the inputted broadcast/video channel selection data 438 to control the broadcast/video channel selection switch 41, thereby selectively switching into digital broadcast/video channels 417-1 to 417-N as required by a subscriber. The digital broadcast/video channels 417-1, 417-2, and 417-N are selected, for example, by a first ONT, a second ONT, and an nth ONT, respectively.

The broadcast/video time-slot multiplexer 42 receives the switched broadcast/video channels in order to form the time-slots defined in FIG. 7. The broadcast/video time-slot multiplexer 42 performs time slot multiplexing for broadcast/video data inputted to the broadcast/video time-slot multiplexer 42 with a data rate of R [b/s] after converting a data rate of the broadcast/video data into a data rate of 1.25/2 k [b/s]. According to one embodiment of the present invention, since it is assumed that all subscribers (ONTs) receive broadcast/video channels, a broadcast/video channel selected by each ONT is positioned at a broadcast/video sub time-slot assigned for each ONT as defined in FIG. 7.

At this time, synchronization for multiplexing time-slots is controlled by the synchronization controlling unit 46 and the broadcast/video and GbE multiplexing control unit 49. Through ranging, which is a function of the PON, the EPON OLT function processing part 45 supplies the synchronization control unit 46 with a basic signal for maintaining synchronization.

Figure 11:
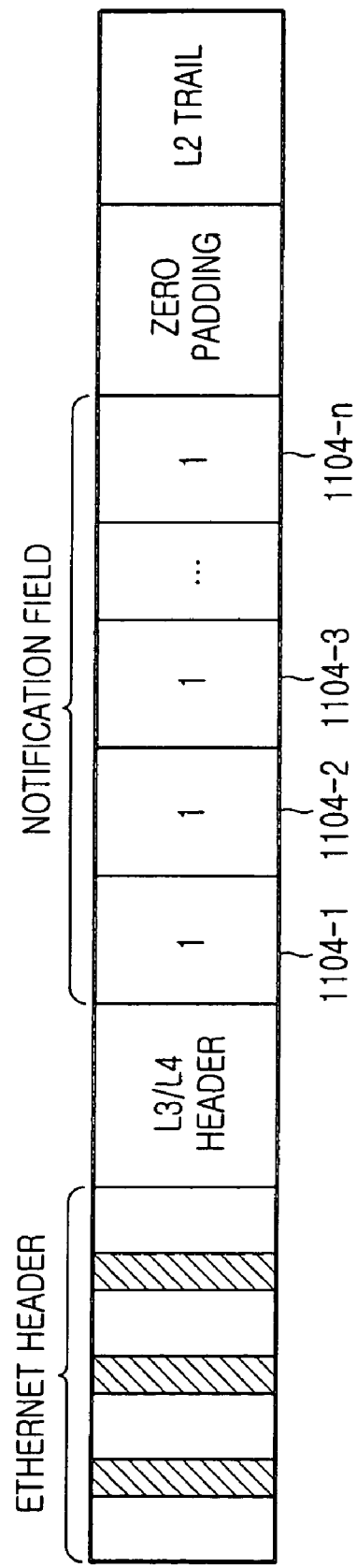
FIG. 11 is a view showing a notification packet structure when all ONT of a system do not receive broadcast/video.

The EPON OLT function processing part 45 likewise applies EPON functions to communication data transferred from an upper-layered IP network. Thereafter, the communication data are inputted to the Ethernet time-slot matching buffer 411, so that the communication data are matched with time-slots defined in FIG. 7. The EPON OLT function processing part 45 generates notification packets with respect to every frame in order to notify all ONTs of whether or not each ONT receives broadcast/video. The notification packets are generated in the notification packet generating part 48 of the EPON OLT function processing part 45. Since it is assumed that all ONTs receive broadcast/video as described above, the notification packets transferred to all ONTs from the OLT are formed as shown in FIG. 11. That is, the notification packets are formed in such a manner that the LLID 96 and the DA 97 are assigned as broadcasting addresses, and the type 98 represents a notification packet type. Also, all bits 1104-1 to 1104-n of the notification fields are set as '1'.

GbE communication data stored in the Ethernet time-slot matching buffer 411 are outputted in a manner that varies with broadcast/video receiving states of ONTs as set forth above with regard to FIG. 7

Broadcast/video signals outputted from the broadcast/video time-slot multiplexer 42 and GbE communication data outputted from the Ethernet time-slot matching buffer 411 are frame-multiplexed in the frame multiplexer 410 as shown in FIG. 5c.

The frame multiplexer 410 and the Ethernet time-slot matching buffer 411 are controlled by the broadcast/video and GbE multiplexing control unit 49. In particular, when the frame multiplexer 410 performs frame multiplexing with respect to broadcast/video time-slots and Ethernet communication data time-slots, synchronization control information regarding each time-slot, and information as to whether the associated data type is to be replaced by the other data type, are delivered to the frame multiplexer, so that, for example, broadcast/video time-slots are replaced with the Ethernet communication data time-slots.

The broadcast/video time-slot reservation/cancellation processing unit 47 sends the broadcast/video and GbE multiplexing control unit 49 information (that is, information of an ONT not receiving broadcast/video) representing time-slots, from among broadcast/video time-slots, to be replaced with Ethernet communication data time-slots. The processing unit 47 also transmits, to the notification packet generating part 48, delivers information used by ONTs in reserving a time for receiving the broadcast/video, and information which is used for canceling the reservation time for broadcast/video.

The frame multiplexed broadcast/video channels and communication data are optically modulated in the optical transmitter 413 onto a wavelength of $\lambda_{down}$ and transferred on downstream optical signals ($\lambda_{down}$) to ONTs in a path through the WDM coupler 414, the 1×n optical splitter 427, the WDM coupler 428 and the optical receiver 430. The received signals are split into Ethernet communication data and broadcast/video channels selected by each of ONTs and are inputted to the Ethernet demultiplexing part 432 and the broadcast/video demultiplexing part 434, respectively.

When notification packets exist in GbE communication data demultiplexed by the Ethernet demultiplexing part 432, the EPON ONT function processing part 431 detects the notification packets and delivers the notification packets to the notification packet processing part 436.

The notification packet processing part 436 analyzes a broadcast/video receiving state of each ONT and transfers information representing the broadcast/video receiving state of each ONT to the demultiplexing control unit 433.

The demultiplexing control unit 433 controls the Ethernet demultiplexing part 432 and the broadcast/video demultiplexing part 434 to separate Ethernet communication data from broadcast/video channels.

According to one embodiment of the present invention, since it is assumed that all ONTs receive broadcast/video, the notification packets are formed as shown in FIG. 11. Therefore, as shown in FIG. 6(a), since the broadcast/video channels 602-1 and 602-2 selected by a first ONT are positioned at a first time-slot of each frame, the first ONT performs filtering in response to a control signal and GbE communication data 605-1 to 605-6 are likewise extracted in response to a control signal.

Problems in relation to synchronization occurring when separating the broadcast/video channels and the communication data are solved by performing synchronization through ranging which is a function of EPON. The extracted GbE communication data shown in FIG. 6d are transferred to terminal units of the ONT such as a computer, etc., or to the notification packet processing part 436 through the EPON ONT function processing part 431.

The extracted broadcast/video channels shown in FIG. 6c are converted into broadcast/video channels 445 having an original data rate of R [b/s] in the broadcast/video matching unit 435 and are transferred to an MPEG decoder, etc.

For upstream operation, each subscriber generates IP communication data created in a computer, etc., and broadcast/video channel selection data 438 for looking at and listening to broadcast/video channels.

Each subscriber additionally generates broadcast/video time-slot reservation/cancellation signals 443 for selecting broadcast/video channels or canceling selection of the broadcast/video channels.

The data generated by a user are optically modulated in the optical transmitter 429 onto a wavelength of $\lambda_{up}$ after the EPON ONT function processing part 431 solves problems such as data collision, and are transferred to an OLT by way of the WDM coupler 428 and the optical splitter 427.

Upstream data signals transferred from each ONT are opto-electrically converted in the optical receiver 412 and inputted to the EPON OLT function processing part 45. The broadcast/video channel selection data 438 are delivered to the broadcast/video channel selection control part 43 and the IP communication data 441 are delivered to an IP network through the IP router 44 or Ethernet backbone switches.

The broadcast/video time-slot reservation/cancellation signals 443 are delivered to the broadcast/video time-slot reservation/cancellation processing unit 47 from the EPON OLT function processing part 45. These reservation/cancellation signals 443 include information representing which ONT starts or stops receiving a broadcast/video channel. For example, when a first ONT, while receiving a broadcast/video channel, stops its receiving operation for the channel, efficiency suggests that the first ONT be afforded GbE communication data by means of the broadcast/video sub time slot of the first time slot. Therefore, the broadcast/video time-slot reservation/cancellation processing unit 47 is required.

The broadcast/video time-slot reservation/cancellation processing unit 47 analyzes which ONTs start or stop receiving broadcast/video channels and delivers analyzed data to the broadcast/video and GbE multiplexing control unit 49.

The broadcast/video and GbE multiplexing control unit 49 allows each ONT to use a broadcast/video channel sub time-slot as a GbE communication sub time-slot depending on a broadcast/video receiving state of each ONT by controlling the broadcast/video time-slot multiplexer 42, the Ethernet time-slot matching buffer 411, and the frame multiplexer 410. Description about this will be given in detail later with reference to FIGS. 15 to 21.

Figure 12:
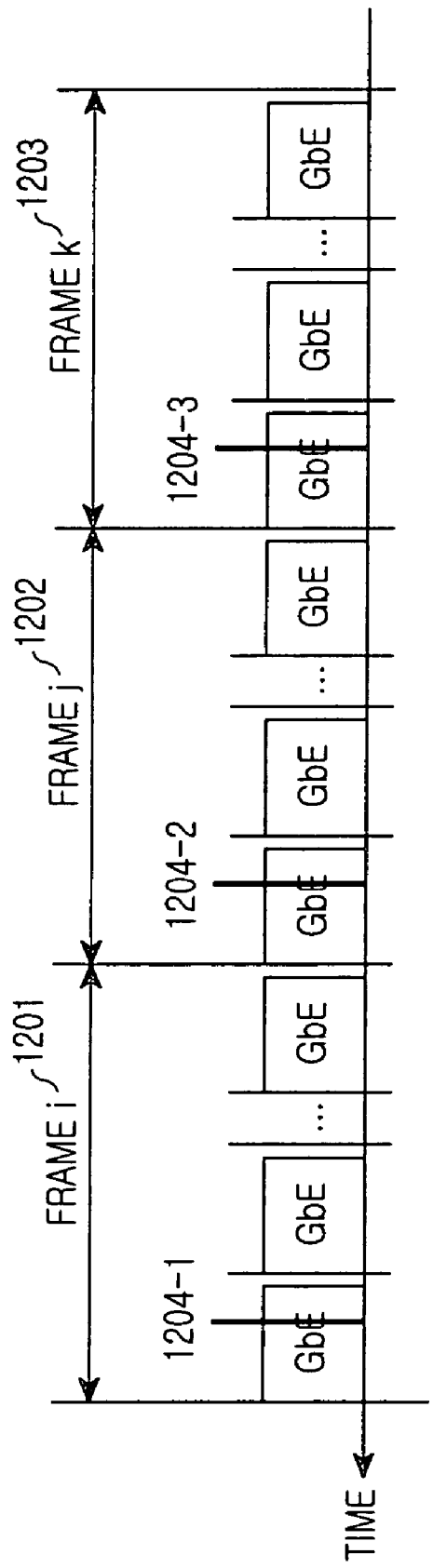
FIG. 12 is a view showing a frame formed when an Ethernet PON for broadcasting/communication convergence using time division multiplexing according to the present invention initially sets up.
Figure 13:
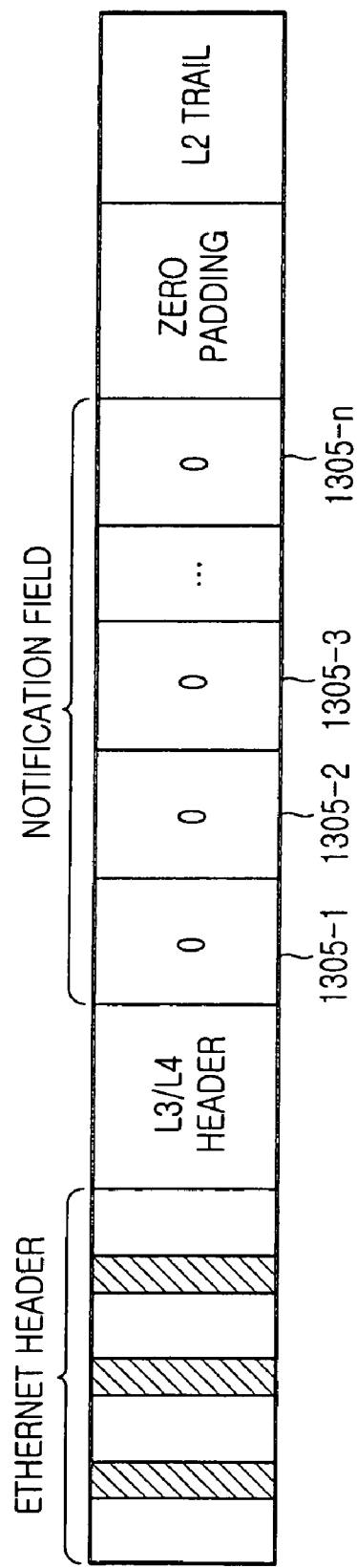
FIG. 13 is a view showing a notification packet structure during initial set-up according to the present invention.

FIG. 12 shows notification frame format at initial set-up for the TDM E-PON according to the present invention. All sub slots of an $i^{th}$ frame 1201, a $j^{th}$ frame 1202, and a $k^{th}$ frame 1203 are utilized for GbE communication data, since none of ONTs receive broadcast/video during initial set-up. As seen in FIGS. 12 and 13, '0' is set for bits 1305-1 to 1305-n of the notification fields in notification packets 1204-1 to 1204-3 positioned at the frames 1201 to 1203.

Figure 14:
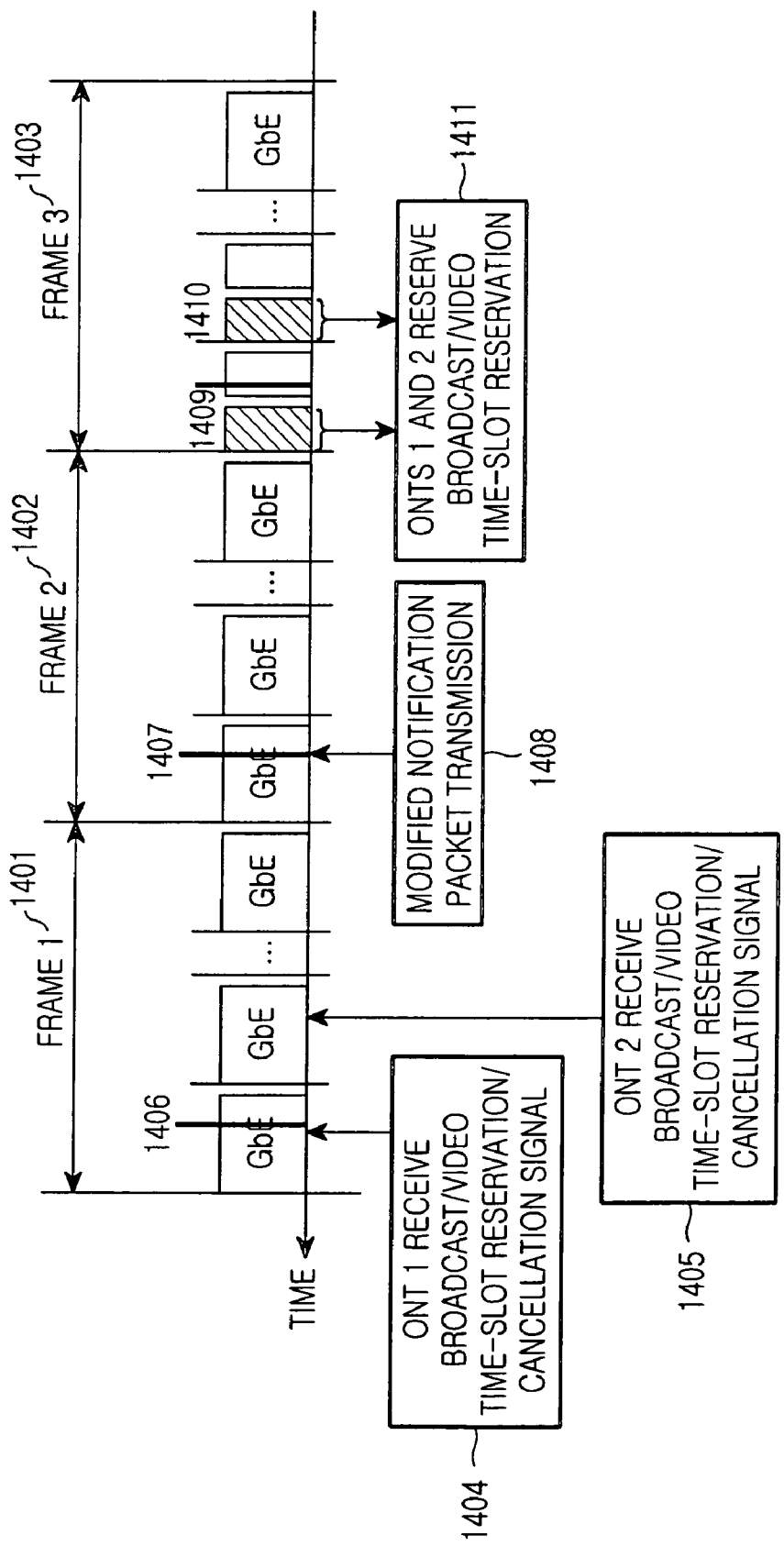
FIG. 14 is a view showing a procedure of reserving broadcast/video time-slots in an Ethernet PON for broadcasting/telecommunication convergence using time division multiplexing according to a first embodiment of the present invention.

FIG. 14 is a view showing a procedure of reserving broadcast/video time-slots in the Ethernet PON for broadcasting/telecommunication convergence using time division multiplexing according to a first embodiment of the present invention.

As shown in FIG. 14, according to the present invention, the procedure of reserving broadcast/video time-slots will be described with three frames including a first frame 1401, a second frame 1402, and a third frame 1403.

When the first ONT and the second ONT turn on set-top boxes in order to receive broadcast/video, the first ONT and the second ONT generate the broadcast/video time-slot reservation signal 439 and transfer the signal to the OLT. This signal may issue at initial network set-up at which time all sub time-slots are devoted to GbE communication data as shown in FIG. 12.

As shown in FIG. 14, when a first ONT broadcast/video time-slot reservation signal is received by the OLT at a first time-slot of a first frame 1401 (step 1404) and a second ONT broadcast/video time-slot reservation signals is received by the OLT at a second time-slot (step 1405), the EPON OLT function processing part 45 transfers the first ONT and the second ONT broadcast/video time-slot reservation signals to the broadcast/video time-slot reservation/cancellation processing unit 47. The latter transfers to the notification packet generating part 48 information representing that the first ONT and the second ONT start receiving broadcast/video channels. Although the notification field for a notification packet 1406 has been cleared to zero at initial set-up, the notification packet generating part 48, in reaction to the received information, changes a value of first and second bits within the notification fields from '0' to '1', so as to create a new notification packet 1407. The created notification packet B 1407 is positioned at a first time-slot of a second frame 1402 and is transferred to all ONTs.

Since broadcast/video channel bands are assigned for the first ONT and the second ONT, the broadcast/video time-slot reservation/cancellation processing unit 47 issues to the broadcast/video and GbE multiplexing control unit 49 broadcast/video channel band assigning signals for the first and second ONTs.

The broadcast/video and GbE multiplexing control unit 49 controls the broadcast/video time-slot multiplexer 42, the Ethernet time-slot matching buffer 411, and the frame multiplexer 410 so as to assign broadcast/video sub time-slots 1409, 1410 of first and second time-slots within a third frame as the broadcast/video channel bands for the first and second ONTs (step 1411). Accordingly, broadcast/video channels selected by the first ONT and the second ONT by means of the broadcast/video channel selection data 438 are positioned at the broadcast/video sub time-slots 1409, 1410 and are transferred to ONTs. The notification packet 1409 within the frame 1403 is identical to the notification packet 1407 within the frame 1402, assuming, for simplicity of demonstration, that broadcast/video time-slot reservation/cancellation signals of other ONTs are not received.

Figure 15:
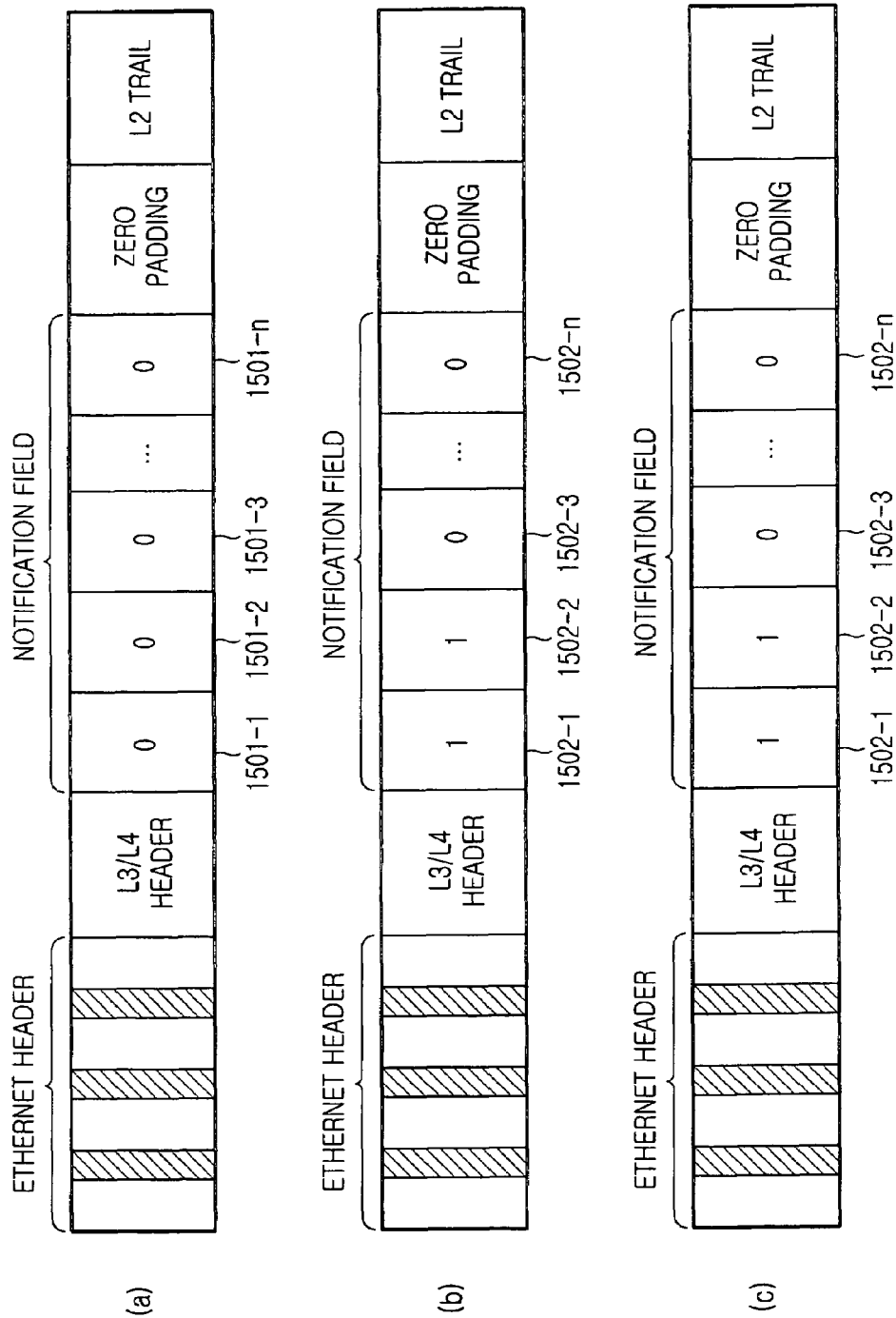
FIG. 15(a)-(c) shows an embodiment for a form of notification packets shown in FIG. 14.

The notification packets 1406, 1407, 1409 are shown in FIG. 15(a)-(c), respectively. Comparing FIG. 15 with FIG. 13, with reference to the above discussion relating to FIG. 14, If a broadcast/video time-slot reservation signal is received at frame i, a notification packet of frame i+1 is changed and transferred and a broadcast/video time-slot is allotted at frame i+2. Accordingly and advantageously, sufficient time required for processing a notification packet is available to avoid or solve synchronization problems.

Figure 16:
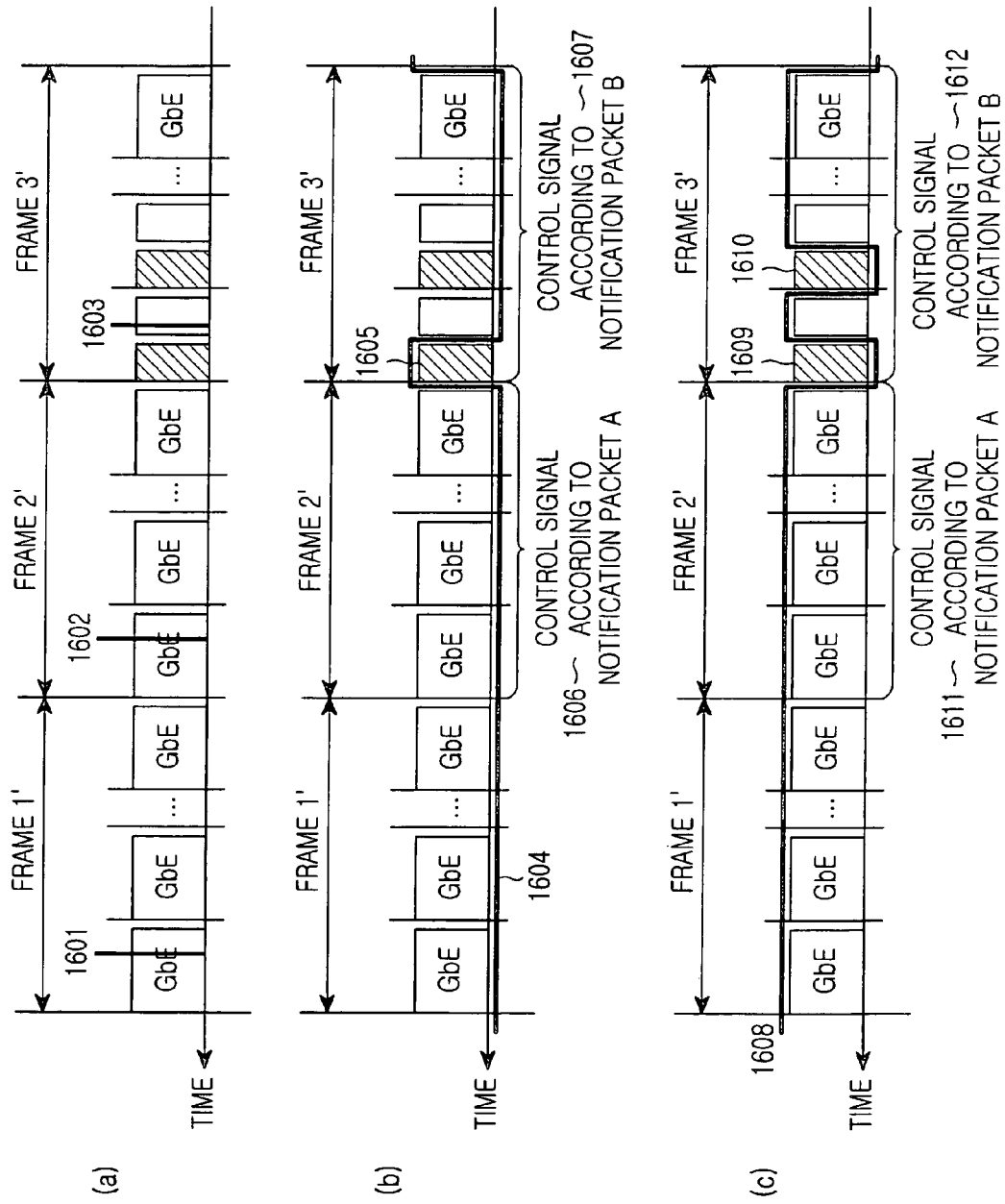
FIG. 16(a)-(c) shows that an ONT receives data and performs demultiplexing in an Ethernet PON for broadcasting/telecommunication convergence using time division multiplexing according to the present invention.

FIG. 16(a)-(c) illustrate demultiplexing in the ONT of an Ethernet PON for broadcasting/telecommunication convergence using time division multiplexing according to the present invention. Data received by the optical receiver 430 of the first ONT are inputted to the Ethernet demultiplexer 432 and the broadcast/video demultiplexer 434. Referring to FIG. 16, since the first ONT does not receive broadcast/video in an initial state, all data of frame 1' are inputted to the EPON ONT function processing part 431. The latter delivers a notification packet 1601 to the notification packet processing part 436. Since all values of notification fields within the notification packet 1601 are '0's, the notification packet processing part 436 determines that none of ONTs receive broadcast/video and transfers information to the demultiplexing control unit 433 representing that none of ONTs receive broadcast/video.

The demultiplexing control unit 433 controls the broadcast/video demultiplexer 434 and the Ethernet demultiplexer 432 according to information of the notification packet A 1601 with respect to frame 2'. This is shown in FIG. 16(b) (step 1606). Similarly, a control in relation to frame 3' is achieved according to information of the notification packet 1602 (step 1607).

When it comes to the frame 2', since none of ONTs receive broadcast/video, all data within the frame 2' are recognized as GbE communication data. Also, the notification packet 1602 exists in the frame 2' and first and second bits 1502-1, 1502-2 of the notification fields within the notification packet B has been set as '1'. That is, since the first ONT and the second ONT start receiving broadcast/video, broadcast/video data in relation to the first ONT and the second ONT exist in the frame 3'. Accordingly, the notification packet processing part 436, which has received the notification packet 1602, notifies the demultiplexing control unit 433 of information representing that the first ONT and the second ONT are to start receiving broadcast/video. Thereafter, the demultiplexing control unit 433 generates a broadcast/video demultiplexing control signal 1604 shown in FIG. 16(b) and an Ethernet demultiplexing control signal 1608 shown in FIG. 16(c) so as to demultiplex to separate the broadcast/video data and the GbE communication data arriving within frame 3'.

In particular, since a broadcast/video channel 1605 selected by the first ONT exists within the frame 3', the broadcast/video channel is, referring to FIG. 16(b), extracted. GbE communication data are extracted from bands used for GbE communication data, i.e., excluding parts 1609, 1610 used for first and second ONT broadcast/video signals.

As seen from FIG. 16(b)-(c), the broadcast/video demultiplexer 434 extracts the first ONT broadcast/video band 1609 of a first time-slot within the frame 3' and the Ethernet demultiplexer 432 excludes broadcast/video sub time-slot parts 1609, 1610 of the first and second time-slots.

As described above, when ONTs do not receive broadcast/video, bands are used for GbE communication data. Thereafter, when specific ONTs start receiving broadcast/video, bands corresponding to the specific ONTs, which have used for GbE communication data, can be utilized for broadcast/video channel bands. Therefore, it is possible to efficiently assign bands in the Ethernet PON.

Figure 17:
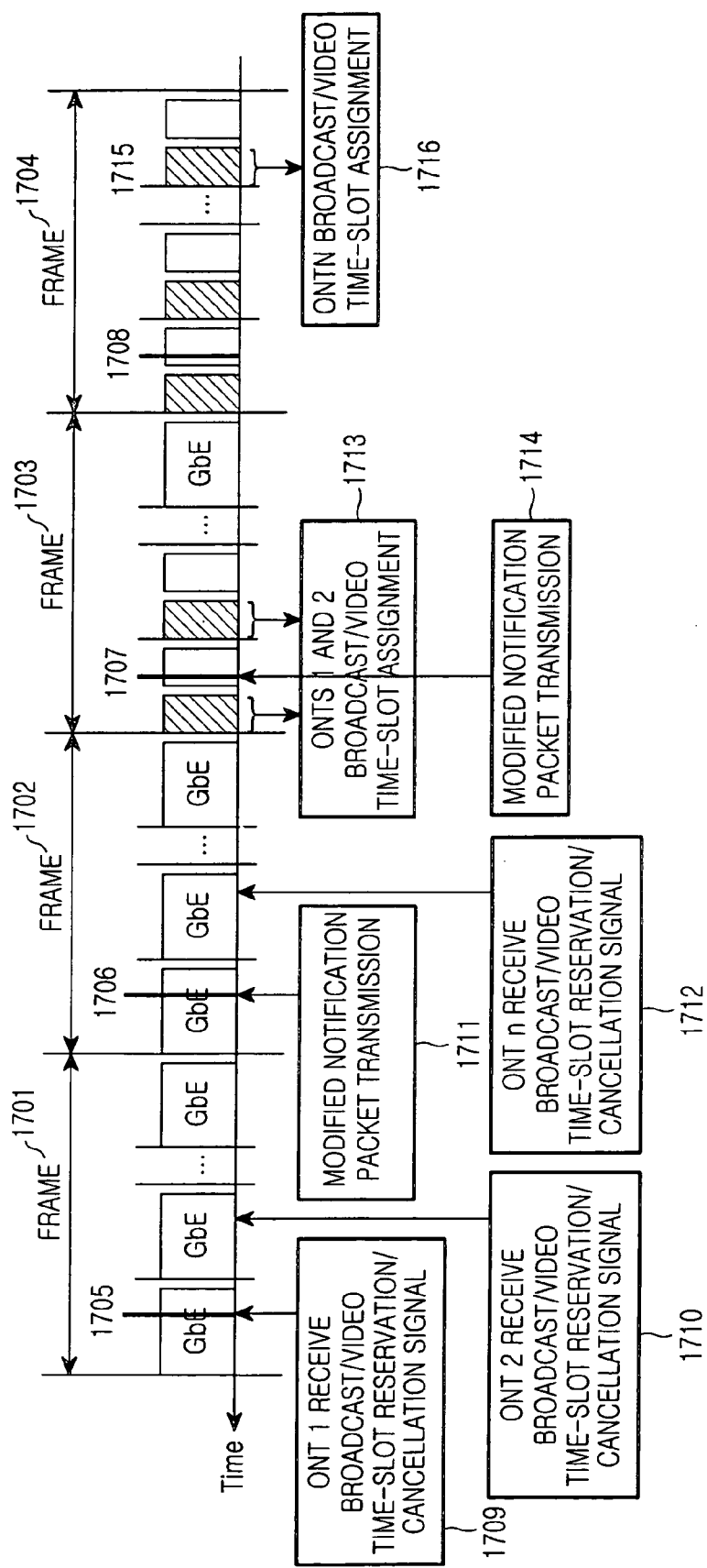
FIG. 17 is a view showing a procedure of reserving broadcast/video time-slots in an Ethernet PON for broadcasting/telecommunication convergence using time division multiplexing according to a second embodiment of the present invention.

FIG. 17 is a view showing a procedure of reserving broadcast/video time-slots according to a second embodiment of the present invention.

As described above, at the early stage of setting up the Ethernet PON, since all bands are used for GbE communication data, all bits of notification fields of a notification packet 1705 within the frame 1701 are set as '0' as shown in FIG. 18(a). Thereafter, if the first and second ONT broadcast/video time-slot reservation signals are received at the frame 1701 (steps 1709, 1710), notification fields of a notification packet 1706 within the frame 1702 are changed as shown in FIG. 18b and the packet is transmitted (step 1711).

Broadcast/video time-slots of first and second time-slots within the frame 1703 are assigned as bands for broadcast/video receiving on behalf of the first ONT and the second ONT (step 1713).

Since a broadcast/video time-slot reservation signal of the $n^{th}$ ONT is received at the frame 1702 (step 1712), a notification packet 1707 to be transferred at the frame 1703 is changed as shown in FIG. 18c and transferred. Specifically, an $n^{th}$ bit 1801 of notification fields is set as '1'. As a consequence, broadcast/video sub time-slot 1715 of an $n^{th}$ time-slot within frame 1704 is assigned as a broadcast/video receiving band of the n$^{th}$ ONT (step 1716).

Figure 18:
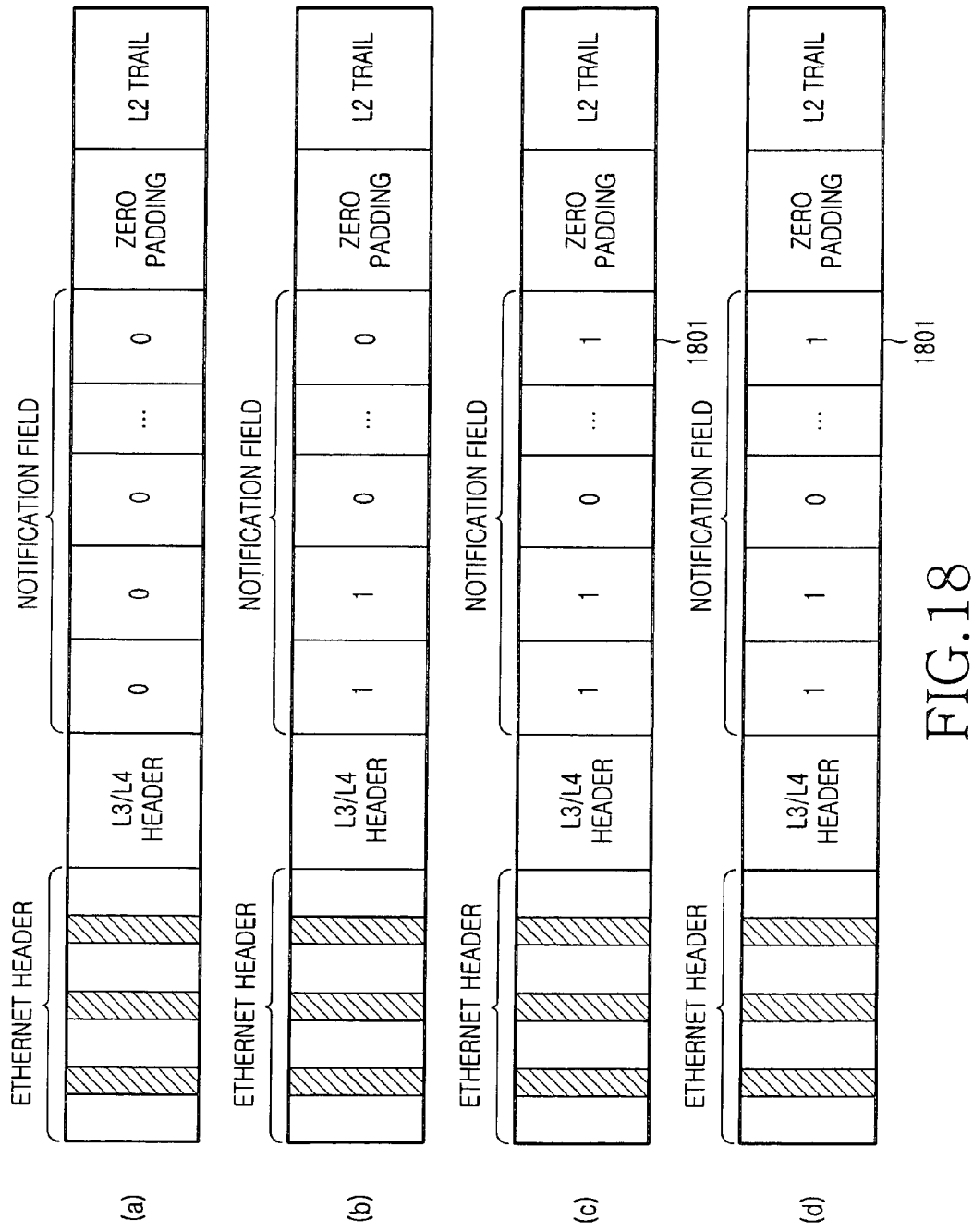
FIG. 18(a)-(d) shows notification packet structures in connection with the procedure described in FIG. 17.

A notification packet 1708 of the frame 1704 has values of the notification packet 1707 as shown in FIG. 18(*c*)-(*d*).

Figure 19:
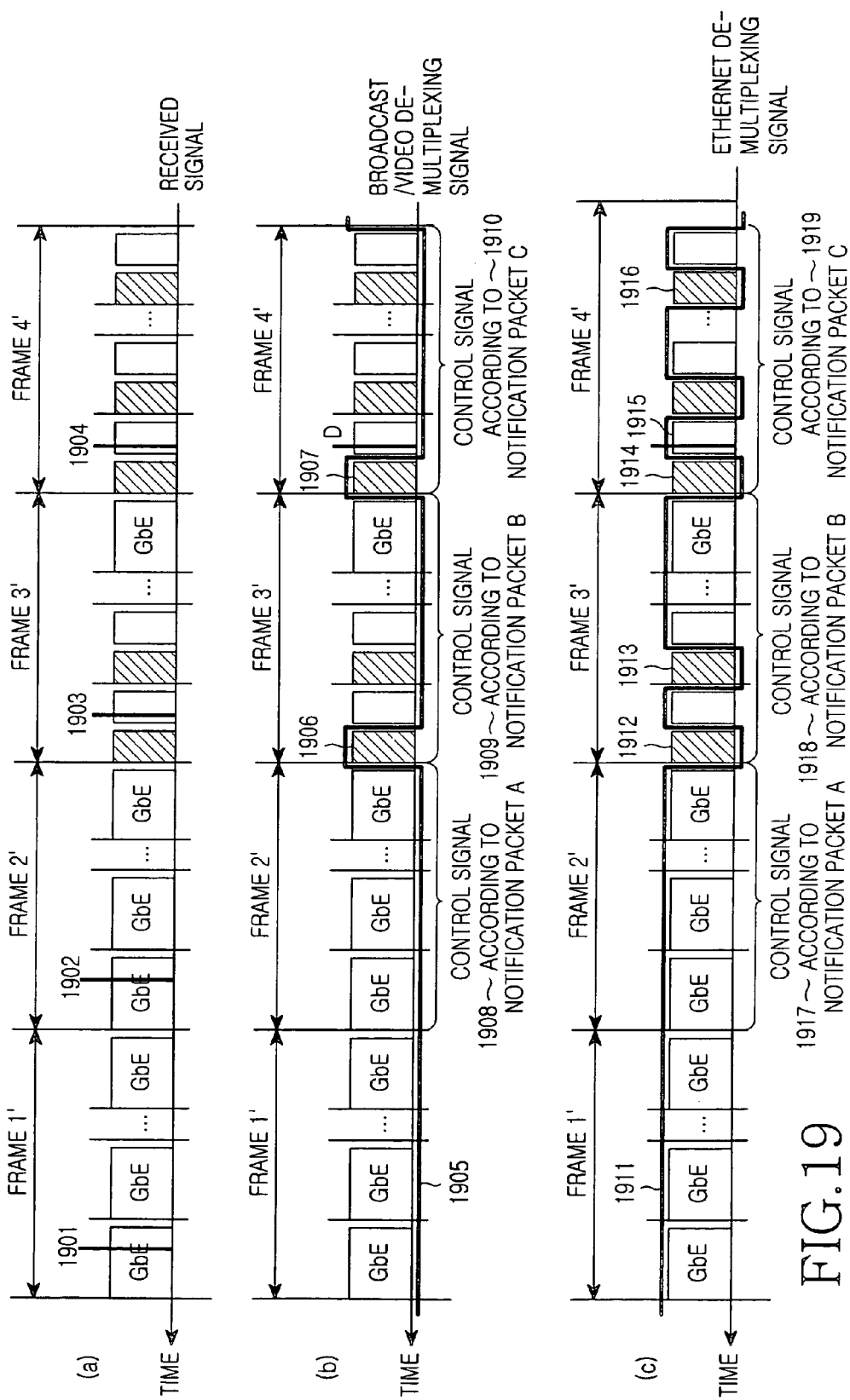
FIG. 19(a)-(c) illustrates a procedure for processing a notification packet shown in FIG. 17 when each ONT receives a notification packet.

FIG. 19(*a*)-(*c*) illustrates processing the notification packet shown in FIG. 17 when each ONT receives the notification packet.

When each ONT receives the notification packet shown in FIG. 17, the notification packet is processed as shown in FIG. 19(*a*)-(*c*).

If the first ONT receives a notification packet 1901 in frame 1', the first ONT analyzes the notification packet and controls frame 2', so that broadcast/video channels and GbE communication data of the first ONT are separated.

The first ONT separates a broadcast/video channel and GbE communication data in frame 3' by analyzing a notification packet 1902 in the frame 2' as shown in FIG. 19(*b*). Since first and second bits of notification fields of the notification packet 1902 are set as '1's, the first ONT generates a control signal 1905, so as to extract the broadcast/video channel 1906 of the first ONT, and the first ONT generates a control signal 1911, so as to extract the GbE communication data.

Since the first and second ONTs receive broadcast/video channels, when the GbE communication data are extracted, broadcast/video sub time-slots corresponding to reference numbers 1912, 1913 are excluded.

Broadcast/video channels and communication data within the frame 4' are extracted by considering the notification packet 1903 within the frame 3'.

Since the first ONT continuously receives broadcast/video, the broadcast/video demultiplexing control signal 1905 is not changed, and a broadcast/video channel 1907 of the first ONT is extracted from the frame 4' by means of the control signal 1905 is not changed. In addition, since a broadcast/video channel of the n$^{th}$ ONT is included in the frame 4', broadcasting/video channels 1914, 1915, 1916 corresponding to the first, second, and n$^{th}$ ONTs, respectively, are not extracted and only communication data are extracted through the GbE demultiplexing control signal 1911 shown in FIG. 19(*c*).

Figure 20:
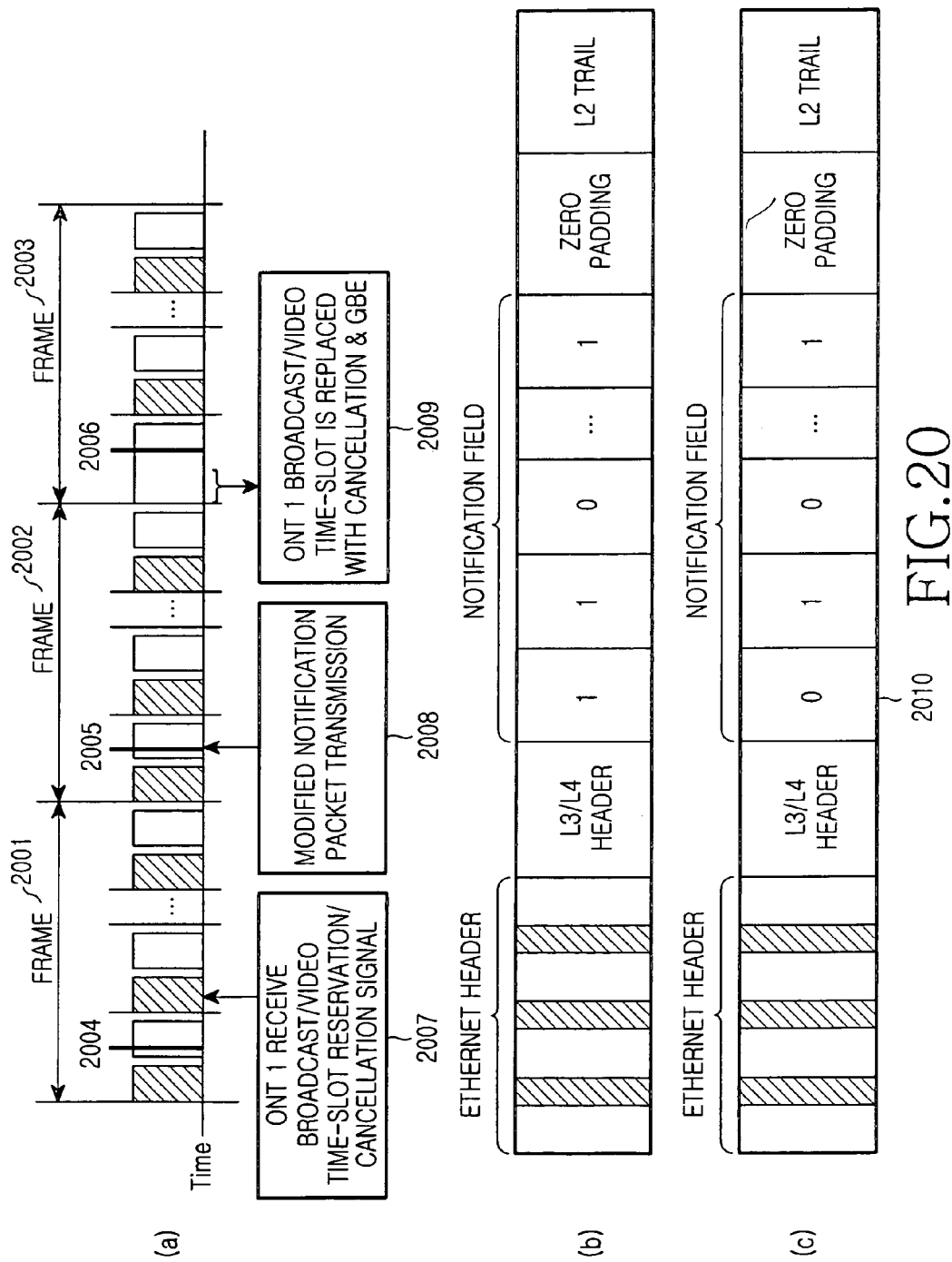
FIG. 20(a)-(c) demonstrates a case in which an ONT, which has received broadcast/video in an Ethernet PON, stops receiving broadcast/video.

FIG. 20(*a*)-(*c*) shows a case in which a first ONT, which has received broadcast/video together with second and n$^{th}$ ONTs, stops receiving broadcast/video.

Since the first, second, and n$^{th}$ ONTs receive broadcast/video, a notification packet 2004 of frame 2001 is identical to the notification packet shown in FIG. 20(*b*). In particular, first, second, and n$^{th}$ bits of notification fields of the notification packet P are set as '1's.

If a broadcast/video time-slot cancellation signal of the first ONT is received at the frame 2001 (step 2007), values of notification fields of a notification packet 2005 within the frame 2002 are changed into values of the notification fields shown in FIG. 20(*c*) so as to be transferred (step 2008). In particular, a first bit 2010 of the notification fields of the notification packet 2005 is changed from '1' into '0' so as to be transferred.

The broadcast/video channel of the first ONT is changed into GbE communication data in the first time-slot of the frame 2003 (step 2009).

In addition, since none of broadcast/video time-slot reservation signals or broadcast/video time-slot cancellation signals are received, a notification packet 2006 within the frame 2003 is identical to the notification packet 2005.

Figure 21:
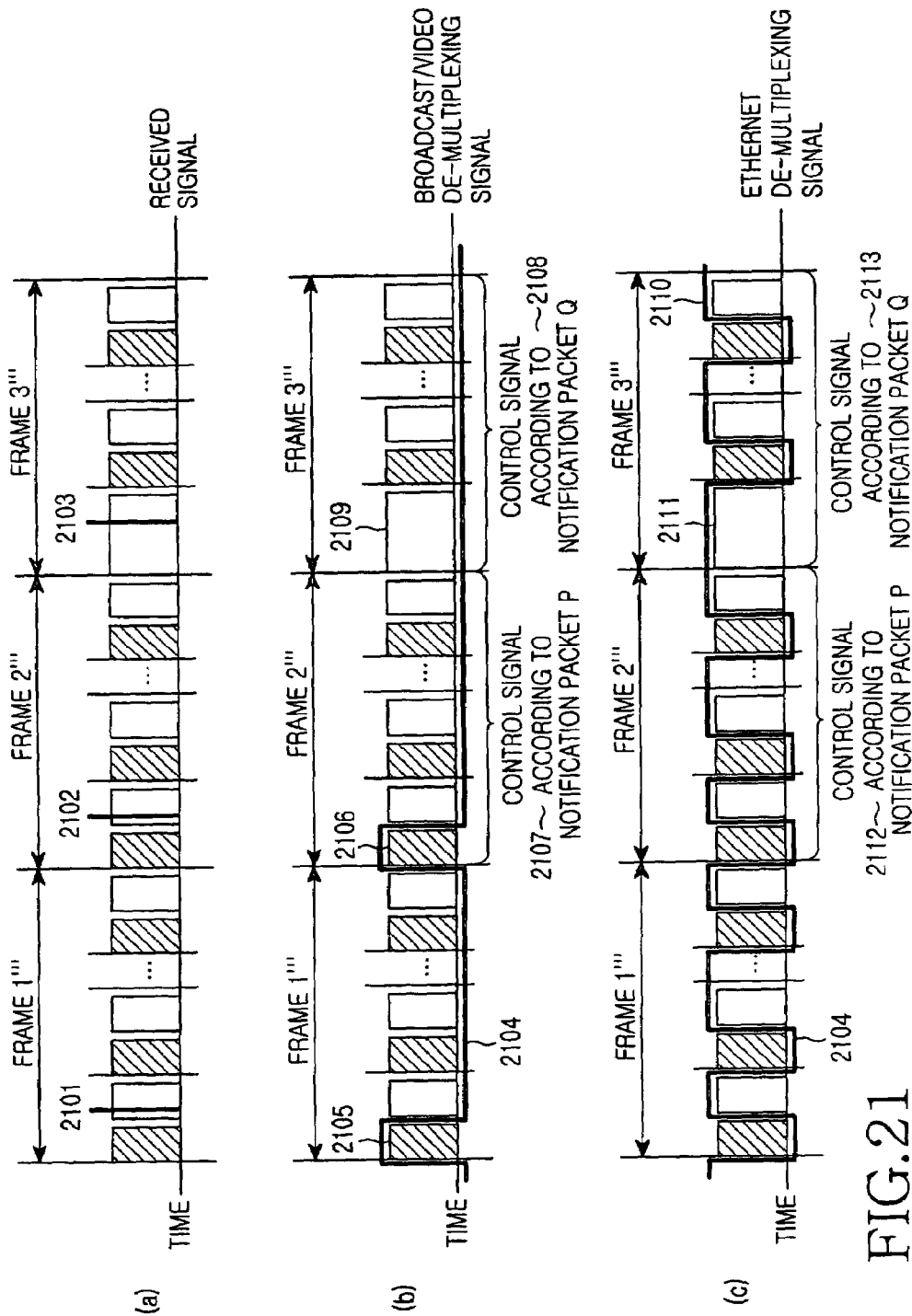
FIG. 21 (a)-(c) presents a demultiplexing procedure of a first ONT in a case in which an ONT receiving broadcast/video in an Ethernet PON according to the present invention stops receiving broadcast/video.

FIG. 21(*a*)-(*c*) depict a demultiplexing procedure of the first ONT in a case in which an ONT receiving broadcast/video in the Ethernet PON according to the present invention stops receiving broadcast/video.

Hereinafter, when the first ONT receives notification packets identical to the notification packets shown in FIG. 20(*a*) (*c*), signals for demultiplexing of the first ONT will be described with reference to FIG. 21(*a*)-(*c*).

The notification packet processing part 436 of the first ONT analyzes a notification packet 2101 so as to generate a broadcast/video demultiplexing control signal and an Ethernet demultiplexing control signal identical to control signals 2104, 2110 within frame 3''', so that broadcast/video data 2105, 2106 and GbE data are separated.

Broadcast/video data and GbE data of the frame 3' are separated by analyzing the notification packet 2102. Therefore, since a first bit of notification fields of the notification packet is set as '0', broadcast/video channels of the first ONT do not exist after the frame 3'. Accordingly, as shown with reference number 2109 in FIG. 21(*b*), data of broadcast/video sub time-slots 2105, 2106, which have used for the first ONT, are processed as GbE communication data. A GbE demultiplexing formation of the frame 3' obtained when data of broadcast/video sub time-slots used for the first ONT are processed as GbE communication data is shown in FIG. 21(*c*).

As described above, according to the present invention, required broadcasting channels selected by a subscriber can be transmitted to an ONT from an OLT without using an EDFA used for receiving plural broadcasting services. An inexpensive, low-requirement optical receiver for receiving broadcasting may therefore be used in the ONT.

Also, according to the present invention, quality of services (QoS) can be ensured when transmitting high definition digital video to be required by subscribers in the future as well as digital broadcasting.

In addition, according to the present invention, bi-directional broadcasting functions can be performed by delivering broadcasting information through communication data lines of an Ethernet passive optical network.

Furthermore, according to the present invention, it is possible to efficiently manage network resources by utilizing time-slots assigned for broadcast/video as data communication time-slots when subscribers do not receive broadcast/video.

While the invention has been shown and described with reference to certain preferred embodiments thereof, it will be understood by those skilled in the art that various changes in form and details may be made therein without departing from the spirit and scope of the invention. Consequently, the scope of the invention should not be limited to the embodiments, but should be defined by the appended claims and equivalents thereof.

What is claimed is:

1. An Ethernet passive optical network (E-PON) comprising:

an optical line terminal (OLT) being configured for time division multiplexing, into respective frames, signals with communication data, said signals to be multiplexed comprising broadcast and video signals and being obtained by performing a switching operation with respect to a plurality of digital broadcast and/or digital video data for downstream delivery to at least one of multiple users of the E-PON, said communication data to be multiplexed being delivered to the network through an Interact protocol network, said performing being carried out according to selection information delivered from one or more said multiple users;

a plurality of optical network terminals (ONTs) configured for outputting broadcast and/or video information included in a time-slot assigned for each optical network terminal and transmitting to each ONT user communication signals pertaining to respective users of multiple ones of the plural ONTs, by receiving and opto-electrically converting optical signals from the OLT and performing by frame, time-slot demultiplexing of the opto-electrically converted optical signals, and for receiving communication signal and broadcast/video selection information delivered from at least one user of the plurality so as to output said selection information to the OLT; and an optical splitter for splitting a signal delivered from the OLT into signals for the ONTs and for combining signals delivered from the ONTs into a signal for transmission to the OLT;

wherein one frame obtained by multiplexing the broadcast/video signal and the communication signal is divided into a predetermined number of time-slots, and each time-slot includes a broadcast/video sub time slot including a broadcast and/or video signal and an Ethernet sub time-slot including a communication signal;

wherein the ONTs receives selection information regarding whether or not each one of the respective users is watching/listening to broadcast/video based on selection information, and transmits said selection information to said OLT, and wherein said OLT transmits notification to a particular ONT that Ethernet communication data is transmitted via the assigned time-slot for broadcast/video of at least one respective user who is not watching/listening to the broad cast/video;

the particular ONT detects and processes the notification received from the OLT, and separates the communication data from the broadcast/video based on the notification information.

2. The E-PON of claim 1, further configured for said multiplexing so as combine into a common frame said signals with communication data.

3. The E-PON of claim 2, further configured for performing said multiplexing time slot by time slot, where a time slot comprises a sub time slot for said signals and a sub time slot for said communication data.

4. The E-PON of claim 2, wherein said OLT being further configured for electro-optically converting output of said multiplexing and delivering the multiplexed output.

5. The E-PON of claim 2, wherein the common frame is allocated among the multiple users.

6. The E-PON of claim 2, wherein each of said respective frames is allocated among the multiple users.

7. The E-PON of claim 1, wherein one frame obtained by said multiplexing is divided into a sub frame for broadcast and/or video and a sub frame for an Ethernet communication signal, and the sub frame for broadcast and/or video includes a broadcast/video time-slot containing a broadcast/video signal corresponding to each ONT.

8. The E-PON of claim 7, wherein the broadcast/video time-slot includes a broadcast and/or video signal selected by the ONT corresponding to an order of the time-slot, and the broadcast/video time-slot is used as an Ethernet time-slot having the communication signal if the broadcast and/or video signal, selected by the ONT, is not existing.

9. The E-PON of claim 8, wherein the sub frame for the Ethernet communication signal and the Ethernet time-slot includes coninunicadon data of all ONTs.

10. An Ethernet passive optical network (E-PON) comprising:
an optical line terminal (OLT) being configured for time division multiplexing, into respective frames, signals with communication data, said signals to be multiplexed comprising broadcast and video signals and being obtained by performing a switching operation with respect to a plurality of digital broadcast and/or digital video data for downstream delivery to at least one of multiple users of the E-PON, said communication data to be multiplexed being delivered to the network through an Internet protocol network, said performing being carried out according to selection information delivered from one or more said multiple users;

a plurality of optical network terminals (ONTs) configured for outputting broadcast and/or video information included in a time-slot assigned for each optical network terminal and transmitting to each ONT user communication signals pertaining to respective users of multiple ones of the plural ONTs, by receiving and opto-electrically converting optical signals from the OLT and performing by frame, time-slot demultiplexing of the opto-electrically converted optical signals, and for receiving communication signal and broadcast/video selection information delivered from at least one user of the plurality so as to output said selection information to the OLT; and an optical splitter for splitting a signal delivered from the OLT into signals For the ONTs and for combining signals delivered from the ONTs into a signal for transmission to the OUT;

wherein the OLT includes a broadcast/video channel selection switch for performing switch operations with respect to motion picture experts group (MPEG) broadcast and video data received from an external device so as to output the MPEG broadcast and video data, a broadcast/video time-slot multiplexer connected to the broadcast/video channel selection switch and performing time division multiplexing for broadcast/video channels selected by each subscriber, an Ethernet PON OLT function processing pan for processing Ethernet-PON OLT functions, a broadcast/video channel selection control part for delivering control signals for selecting broadcast/video channels to the broadcast/video channel selection switch after receiving selection channel information from the ONTs, an IP router for routing communication data to an upper-layer IP network or the Ethernet PON OLT function processing part, a broadcast/video time-slot reservation/cancellation processing unit for processing broadcast/video time-slot reservation/cancellation signals transferred from each ONT through the Ethernet PON OLT function processing part, a notification packet generating part for, using broadcast/video time-slot reservation/cancellation information corresponding to each ONT delivered from the broadcast/video time-slot reservation/cancellation processing unit, generating notification packets for notifying each ONT of whether or not the ONT being notified receives broadcast/video, an Ethernet time-slot matching buffer for storing the communication signal sent to each ONT from the Ethernet PON OLT function processing part in order to match the communication signal with time-division multiplexed broadcast/video signal so as to deliver a matched signal to each ONT, a synchronization control unit, which, by using the control signals delivered from the Ethernet PON OLT function processing part, provides synchronization for the broadcast/video time-slot multiplexer and a broadcast/video and GbE multiplexing control unit, said broadcast/video and GbE multiplexing control unit for controlling the Ethernet time-slot matching buffer, the broadcast/video time-slot multiplexer, and a frame multiplexer by using broadcast/video time-slot reservation and cancellation information delivered from the broadcast/video time-slot reservation/cancellation processing unit and synchronization control information delivered from the synchronization control unit, said frame multiplexer for multiplexing broadcast/video signals of the broadcast/video time-slot multiplexer, which are multiplexed by time-slot to compose respective frames, and Ethernet communication signals stored in the Ethernet time-slot matching buffer, under a control of the broadcast/video and GbE multiplexing control unit, a first optical transmitter for optically modulating the signals frame-multiplexed through the frame multiplexer so as to transfer the frame multiplexed signals as optical signals $\lambda_{down}$, and a first optical receiver for receiving optical signals from the ONTs and converting the optical signals into electrical signals so as to deliver the electrical signals to the Ethernet PON OLT processing part.

11. The E-PON of claim 10, wherein the notification packet includes an Ethernet head field having a logical link identifier (LLI), a destination media access control (MAC) address, and a type section for representing data types, notification fields representing information regarding whether or not each ONT receives broadcast and/or video, a zero padding field used for achieving a minimum length of 64 bytes, and a layer 2 trail field, and is included in a first communication signal of each frame when the frame multiplexer performs frame multiplexing.

12. An Ethernet passive optical network (E-PON) comprising:

an optical line terminal (OLT) being configured for time division multiplexing, into respective frames, signals with communication data, said signals to be multiplexed comprising broadcast and video signals and being obtained by performing a switching operation with respect to a plurality of digital broadcast and/or digital video data for downstream delivery to at least one of multiple users of the E-PON, said communication data to be multiplexed being delivered to the network through an Internet protocol network, said performing being carried out according to selection information delivered from one or more said multiple users;

a plurality of optical network terminals (ONTs) configured for outputting broadcast and/or video information included in a time-slot assigned for each optical network terminal and transmitting to each ONT user communication signals pertaining to respective users of multiple ones of the plural ONTs, by receiving and opto-electrically converting optical signals from the OLT and performing by frame, time-slot demultiplexing of the onto-electrically converted optical signal and for receiving communication signal and broadcast/video selection information delivered from at least one user of the plurality so as to output said selection information to the OLT; and an optical splitter for splitting a signal delivered from the OLT into signals for the ONTs and for combining signals delivered from the ONTs into a signal for transmission to the OLT;

wherein each of the ONTs includes a second optical receiver for receiving signals delivered as the optical signals $\lambda_{down}$ from the OLT so as to opto-electrically convert the signals, a second optical transmitter for electro-optically converting upstream data so as to transmit the converted upstream data to the OLT, an Ethernet demultiplexer for extracting Ethernet signals from frame multiplexed signals, which are opto-electrically converted signals and delivered through the optical receiver, a broadcast/video demultiplexer for extracting broadcast/video signals from the frame multiplexed signals, which are opto-electrically converted signals and delivered through the optical receiver, an E-PON ONT function processing part for receiving Ethernet signals from the Ethernet demultiplexer so as to deal with the Ethernet signals and delivering upstream signals to the second optical transmitter, a notification packet processing part, connected to the E-PON ONT function processing part, for processing a notification packet included in a frame-multiplexed signal converted into the electrical signals, a demultiplexing control unit connected to the notification packet processing part and controlling the Ethernet demultiplexer and the broadcast/video demultiplexer according to notification packet information, and a broadcast/video matching unit for outputting broadcast/video streams by recovering the broadcast/video streams from broadcast/video signals in a form of a time-slot, which are delivered from the broadcast/video demultiplexer.

13. The E-PON of claim 12, wherein one frame obtained by multiplexing the broadcast/video signal and the communication signal is divided into a predetermined number of time-slots, and each time-slot includes a broadcast and/or video sub time slot including a broadcast/video signal and an Ethernet sub time-slot including a communication signal.

14. The E-PON of claim 13, wherein the broadcast and/or video sub time-slot includes a broadcast/video signal selected by the ONT according to order of the time-slot and is used as an Ethernet sub time-slot including the communication signal if a broadcast/video signal selected by the ONT does not exist.

15. The E-PON of claim 14, wherein the Ethernet sub time-slot includes communication data of all ONTs.

* * * * *